US012609432B2

(12) United States Patent
Takahashi et al.

(10) Patent No.: US 12,609,432 B2
(45) Date of Patent: Apr. 21, 2026

(54) WAVEGUIDE

(71) Applicant: Panasonic Intellectual Property Management Co., Ltd., Osaka (JP)

(72) Inventors: Ken Takahashi, Ishikawa (JP); Tomohiro Murata, Kanagawa (JP); Koji Takinami, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 114 days.

(21) Appl. No.: 18/691,393

(22) PCT Filed: Mar. 29, 2022

(86) PCT No.: PCT/JP2022/015658
§ 371 (c)(1),
(2) Date: Mar. 12, 2024

(87) PCT Pub. No.: WO2023/042466
PCT Pub. Date: Mar. 23, 2023

(65) Prior Publication Data

US 2024/0380089 A1 Nov. 14, 2024

(30) Foreign Application Priority Data

Sep. 17, 2021 (JP) ................................ 2021-152096

(51) Int. Cl.
*H01P 3/12* (2006.01)
*H01P 3/00* (2006.01)
*H01P 5/00* (2006.01)

(52) U.S. Cl.
CPC ................ *H01P 3/121* (2013.01); *H01P 3/00* (2013.01); *H01P 3/12* (2013.01); *H01P 5/00* (2013.01)

(58) Field of Classification Search
CPC ...... H01P 3/00; H01P 3/02; H01P 3/12; H01P 3/121; H01P 3/123; H01P 5/00;
(Continued)

(56) References Cited

U.S. PATENT DOCUMENTS

2009/0309680 A1* 12/2009 Suzuki .................... H01P 3/121 333/254
2011/0084398 A1* 4/2011 Pilard ..................... H01P 5/107 257/774
2022/0359967 A1* 11/2022 Vosoogh ................ H01P 1/207

FOREIGN PATENT DOCUMENTS

JP 2001156510 A 6/2001

OTHER PUBLICATIONS

Bozzi et al., "Modeling of Losses in Substrate Integrated Waveguide by Boundary Integral-Resonant Mode Expansion Method," IEEE MTT-S International Microwave Symposium Digest, 2008, pp. 515-518, 4 pages.

(Continued)

*Primary Examiner* — Stephen E. Jones
(74) *Attorney, Agent, or Firm* — Seed Intellectual Property Law Group LLP

(57) ABSTRACT

This waveguide comprises: a first multilayered board in which a first dielectric layer and a plurality of first conductive layers the latter of which has a first opening are stacked; a first through via group in which a plurality of first through vias for electrically connecting the first conductive layers are aligned, in an in-plane direction of the first multilayered board, at intervals that are equal to or less than the one-half wavelength of an electromagnetic wave that is to be caused to propagate through the waveguide; and a second through via group in which a plurality of second through vias for electrically connecting the first conductive layers are aligned at said intervals in the in-plane direction. The waveguide does not have any through vias other than the plurality of (Continued)

first through vias and the plurality of second through vias. The first through via group and the second through via group are arranged, in the in-plane direction, in a direction orthogonal to the direction of the electric field of signals propagating in the thickness direction of the first multilayered board and are opposed to each other with the first opening therebetween.

9 Claims, 26 Drawing Sheets

(58) Field of Classification Search
CPC .... H01P 5/02; H01P 5/024; H01P 1/04; H01P 1/042; H01P 1/207
USPC .......................................................... 333/239
See application file for complete search history.

(56) References Cited

OTHER PUBLICATIONS

International Search Report dated Jul. 5, 2022, for the corresponding International Patent Application No. PCT/JP2022/015658, 4 pages. (With English Translation).

* cited by examiner

FIG. 12
Conductor loss [W]
0.05
0.04
0.03
0.02
0.01
0
Comparative Example 1
Example 1

WAVEGUIDE

TECHNICAL FIELD

The present disclosure relates to a waveguide.

BACKGROUND ART

A microstrip line is often used as a means for transmitting a high-frequency signal on a dielectric substrate. However, in frequency bands of millimeter waves, terahertz waves, and the like, the transmission loss due to conductor loss increases due to an influence of the skin effect and interface unevenness, which are phenomena specific to high frequencies.

In order to reduce such a transmission loss, a waveguide structure in which an electromagnetic wave propagates through a dielectric substrate including no conductor interconnections may be used as a transmission path with a small loss, for example, as disclosed in Non-Patent Literature (hereinafter, referred to as "NPL") 1.

Typical waveguide structures formed in the dielectric substrate include a waveguide structure in a substrate surface in which an electrically grounded interconnection layer is used for a top plate and a bottom plate, and vias connecting between the top plate and the bottom plate are arranged side by side on the opposite sides to form sidewalls.

Examples of a waveguide in a substrate thickness direction in such a waveguide structure include a structure in which pieces of copper foil including an opening are laminated at spacings equal to or less than λe/2 ("λe" denotes an effective wavelength of a transmitted signal) in the thickness direction, and vias are arranged around the opening, for example, as disclosed in Patent Literature (hereinafter, referred to as "PTL") 1.

The reason for arranging the vias around the opening as described above is to make the waveguide similar to a metal waveguide structure surrounded by metal walls at the four sides and to expect an effect of reliably suppressing leakage of an electromagnetic wave propagating inside.

CITATION LIST

Patent Literature

PTL 1
Japanese Patent Application Laid-Open No. 2001-156510

Non-Patent Literature

NPL 1
M. Bozzi, L. Perregrini, K. Wu, "Modeling of Losses in Substrate Integrated Waveguide by Boundary Integral-Resonant Mode Expansion Method," 2008 IEEE MTT-S International Microwave Symposium Digest (2008), pp. 515-518

SUMMARY OF INVENTION

However, in the technique described in PTL 1, the loss due to the conductor loss by a current flowing through the surrounding through conductors tends to be more significant in the high-frequency bands of 100 GHz and above.

One non-limiting and exemplary embodiment of the present disclosure facilitates providing a waveguide capable of reducing loss due to conductor loss in a high frequency band.

A waveguide according to one exemplary embodiment of the present disclosure includes: a first laminated substrate in which a first dielectric layer and a plurality of first conductor layers including a first opening are laminated on each other; a first through-via group of a plurality of first through-vias electrically connecting between the plurality of first conductor layers, the plurality of first through-vias being linearly arrayed in an in-plane direction of the first laminated substrate at a spacing equal to or less than a half wavelength of an electromagnetic wave propagating through the waveguide; and a second through-via group of a plurality of second through-vias electrically connecting between the plurality of first conductor layers, the plurality of second through-vias being linearly arrayed at the spacing in the in-plane direction of the first laminated substrate, in which the waveguide includes no other through-via than the plurality of first through-vias and the plurality of second through-vias, and in the in-plane direction of the first laminated substrate, the first through-via group and the second through-via group are disposed in a direction orthogonal to a direction of an electric field of a signal propagating in a thickness direction of the first laminated substrate, and are disposed to face each other across the first opening.

According to one exemplary embodiment of the present disclosure, it is possible to reduce loss due to conductor loss in a high-frequency band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with appropriate reference to the drawings. However, any unnecessarily detailed description may be omitted. For example, detailed descriptions of already well-known matters and repeated descriptions for substantially the same configuration may be omitted. This is to avoid the unnecessary redundancy of the following description and to facilitate understanding of those skilled in the art.

Note that, the accompanying drawings and the following description are provided so that a person skilled in the art understands the present disclosure sufficiently, and are not intended to limit the subject matters recited in the claims.

Embodiment 1

Hereinafter, Embodiment 1 will be described with reference to FIGS. 1 to 20.

Example 1

Configuration of Waveguide

Figure 1:
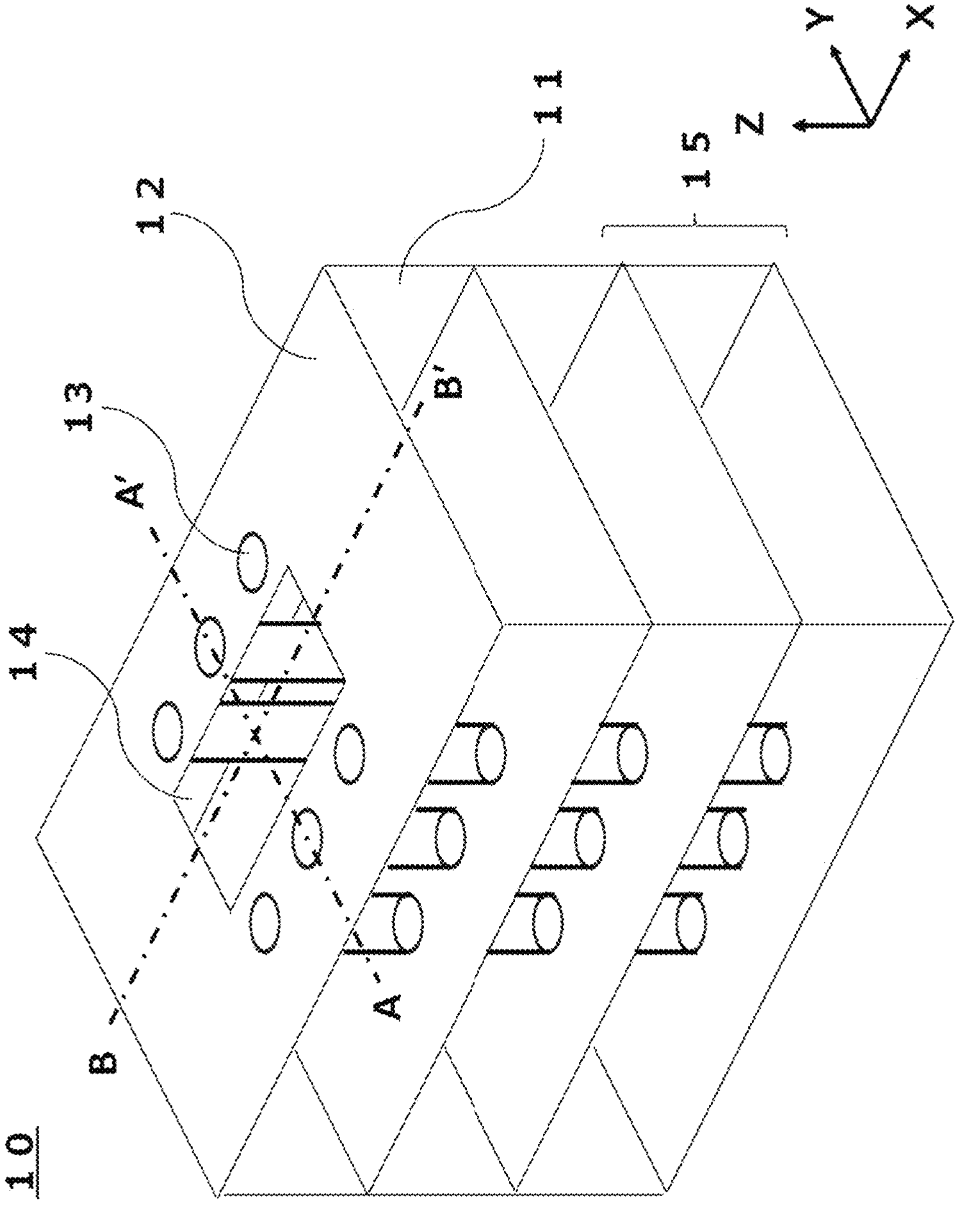
FIG. 1 is a perspective view illustrating a waveguide according to Example 1 of Embodiment 1 of the present disclosure.
Figure 2:
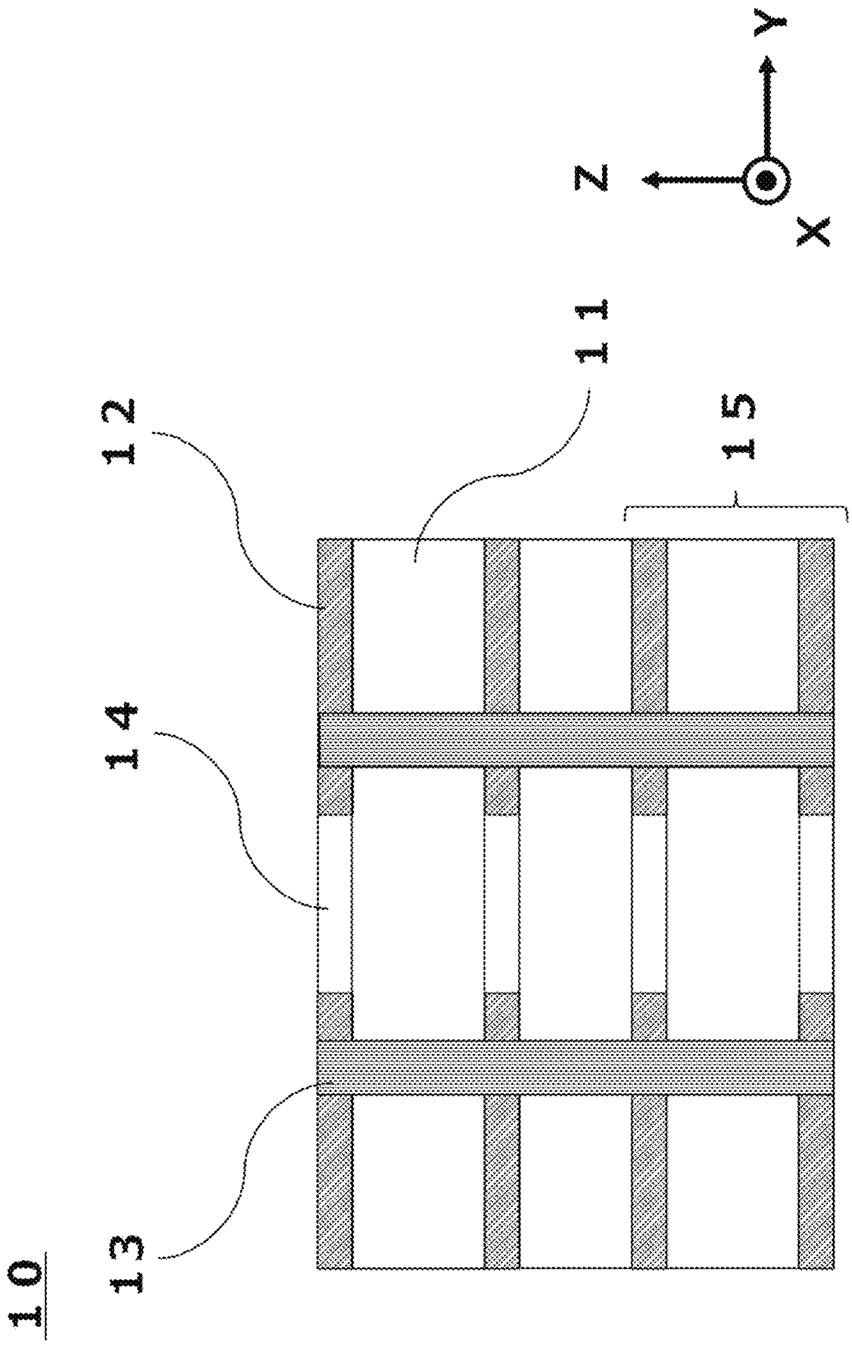
FIG. 2 illustrates a sectional view of the waveguide according to Example 1 taken along line A-A'.
Figure 3:
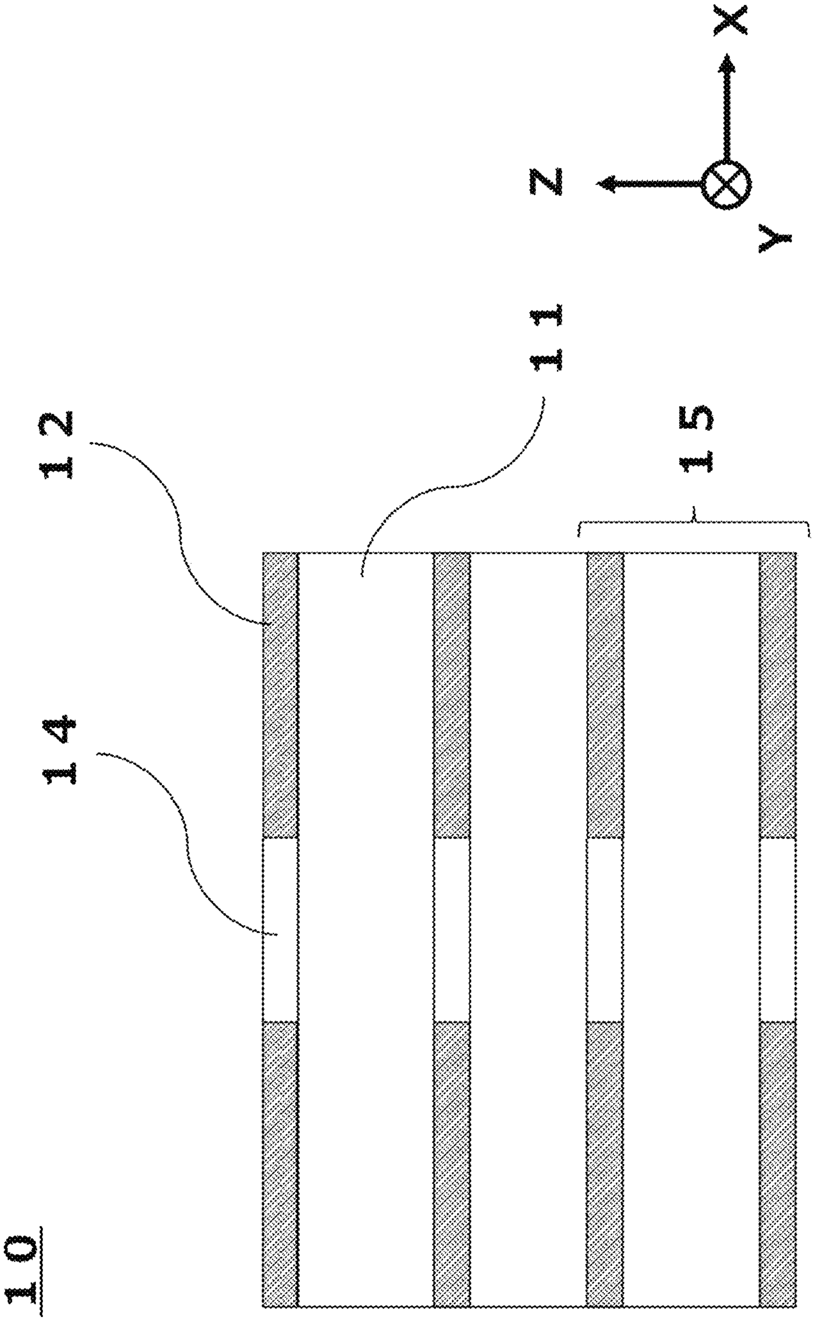
FIG. 3 illustrates a sectional view of the waveguide according to Example 1 taken along line B-B'.
Figure 4:
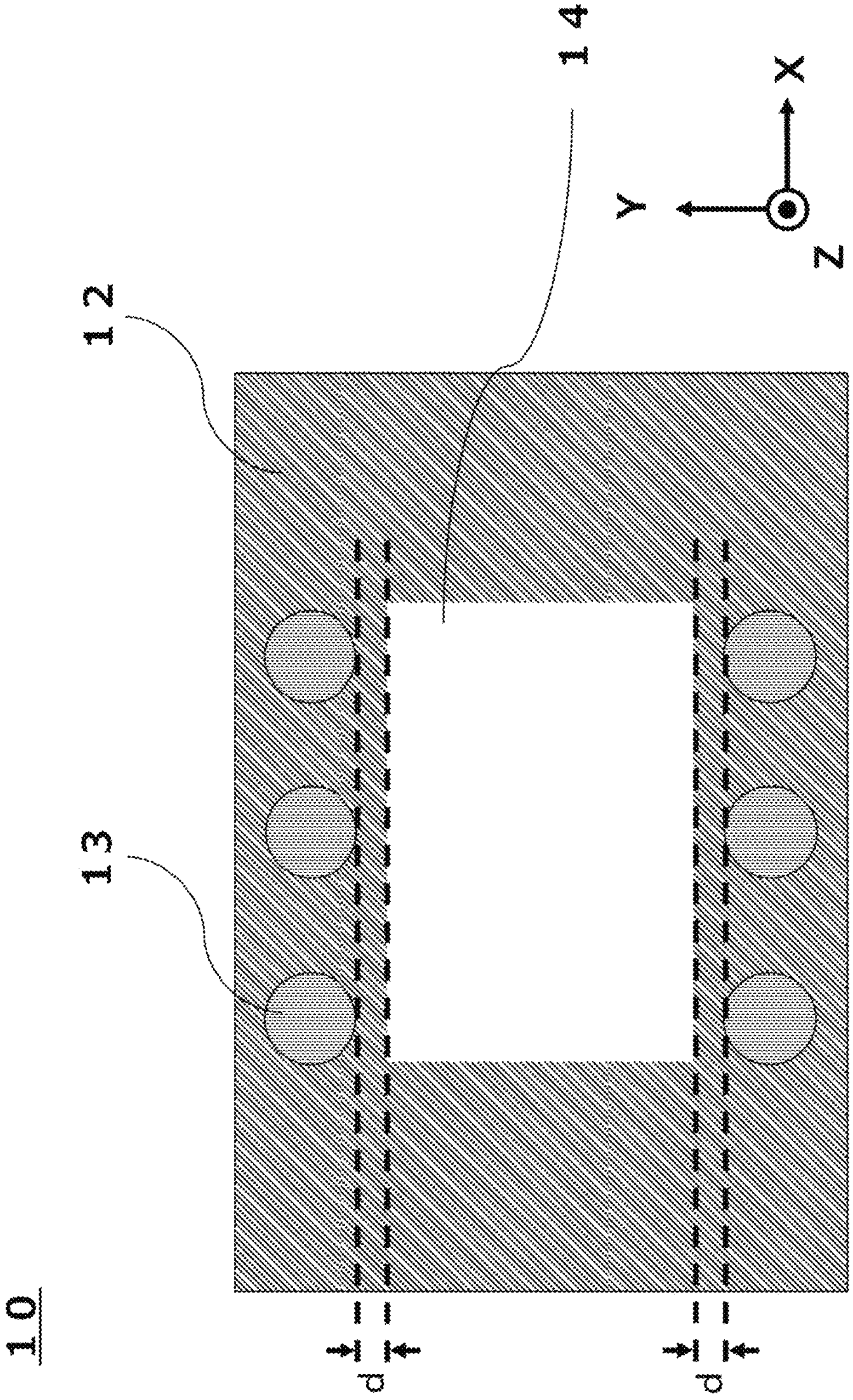
FIG. 4 is a plan view illustrating the waveguide according to Example 1 as seen in the Z-axis positive direction.

FIG. 1 is a perspective view illustrating waveguide 10 according to Example 1 of Embodiment 1 of the present disclosure. FIG. 2 is a sectional view of waveguide 10 taken along line A-A'. FIG. 3 is a sectional view of waveguide 10 taken along line B-B'. FIG. 4 is a plan view illustrating waveguide 10 as seen in the Z-axis positive direction of FIG. 1, and FIG. 5 is a view illustrating an electric field in waveguide 10 as seen in the Z-axis positive direction.

As illustrated in FIGS. 1 to 3, waveguide 10 includes laminated substrate 15 and a plurality of vias 13. Laminated substrate 15 is formed by laminating copper foil layer 12, which is one example of a conductor layer, on dielectric layer 11 at least once. Copper foil layer 12 is formed on the opposite surfaces (upper surface and lower surface) of laminated substrate 15 on which waveguide 10 is formed. A plurality of vias (through-vias) 13 are formed so as to electrically connect between at least two copper foil layers 12 and penetrate through dielectric layer 11 and copper foil layer 12. Note that a semiconductor layer may be used instead of dielectric layer 11.

Figure 5:
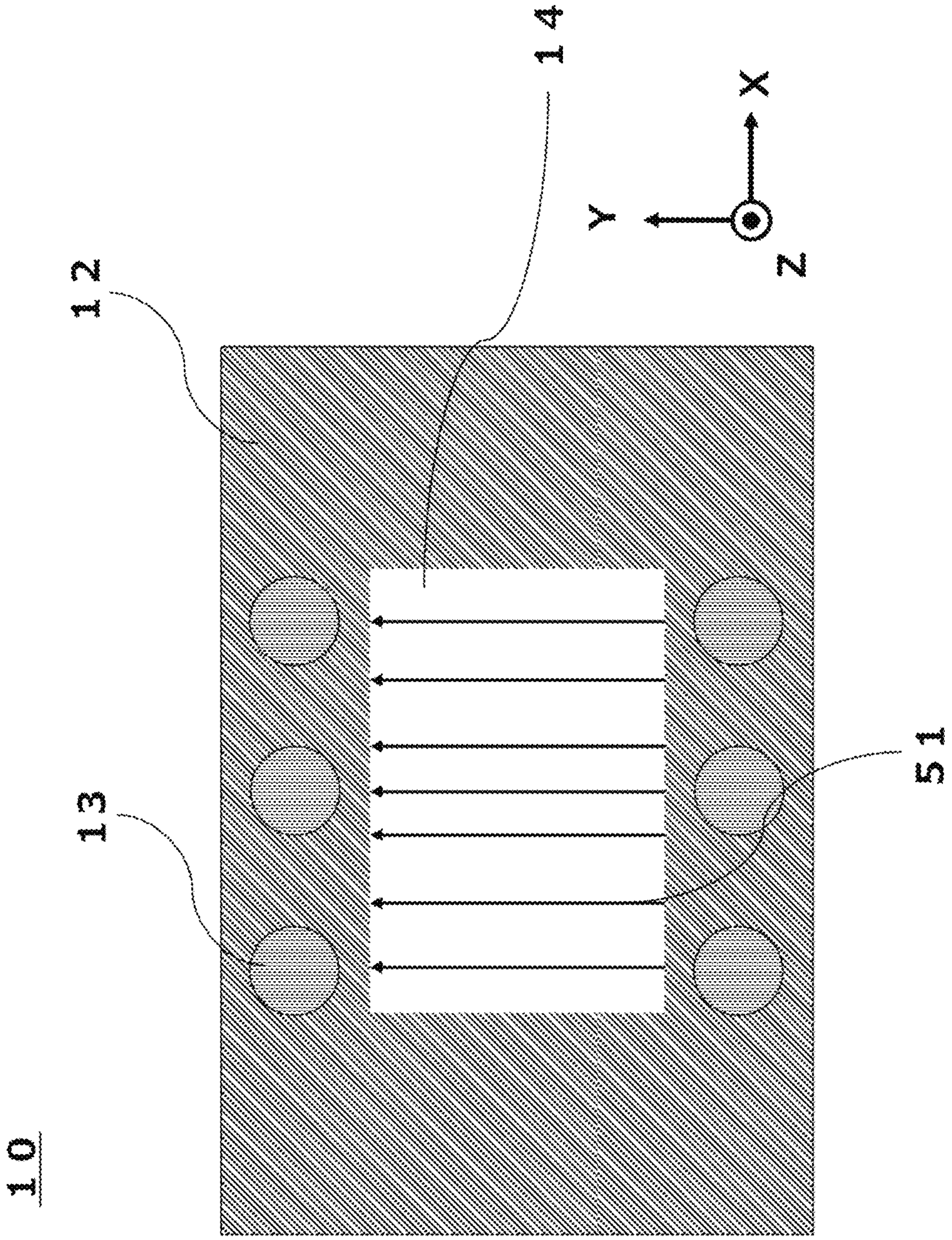
FIG. 5 illustrates an electric field in the waveguide according to Example 1 as seen in the Z-axis positive direction.

As illustrated in FIGS. 1, 4, and 5, each copper foil layer 12 formed on laminated substrate 15 includes opening 14 having a rectangular shape, and is laminated in the substrate thickness direction (direction parallel to the Z-axis in FIG. 1).

With such a configuration, waveguide 10 is capable of allowing an electromagnetic wave to propagate in the substrate thickness direction (transmitting (propagating) a signal).

Here, when the wavelength of the electromagnetic wave transmitted in waveguide 10 is denoted by $\lambda$, it is desirable that the thickness of dielectric layer 11 be equal to or less than $\lambda e/2$.

As illustrated in FIGS. 1, 4, and 5, vias 13 electrically connecting laminated copper foil layers 12 are linearly disposed (arrayed) in the vicinities of the long sides (parallel to the X-axis in FIG. 1) of opening 14 at spacings equal to or less than $\lambda e/2$ in the in-plane direction of dielectric layer 11 and copper foil layers 12 (in the in-plane direction of the substrate, for example, in the XY plane in FIG. 1). Here, it is desirable that spacing d from the long side (opening end portion) to via ends illustrated in FIG. 4 is equal to or less than $\lambda/12$. By way of example, the figures illustrate six vias 13 of three vias in the vicinity of each long side, but the number of vias 13 is not limited to six. In the figures, the spacings between vias in the in-plane direction of the substrate are equal spacings, but may be unequal spacings as long as the spacings are equal to or less than $\lambda e/2$.

Figure 25:
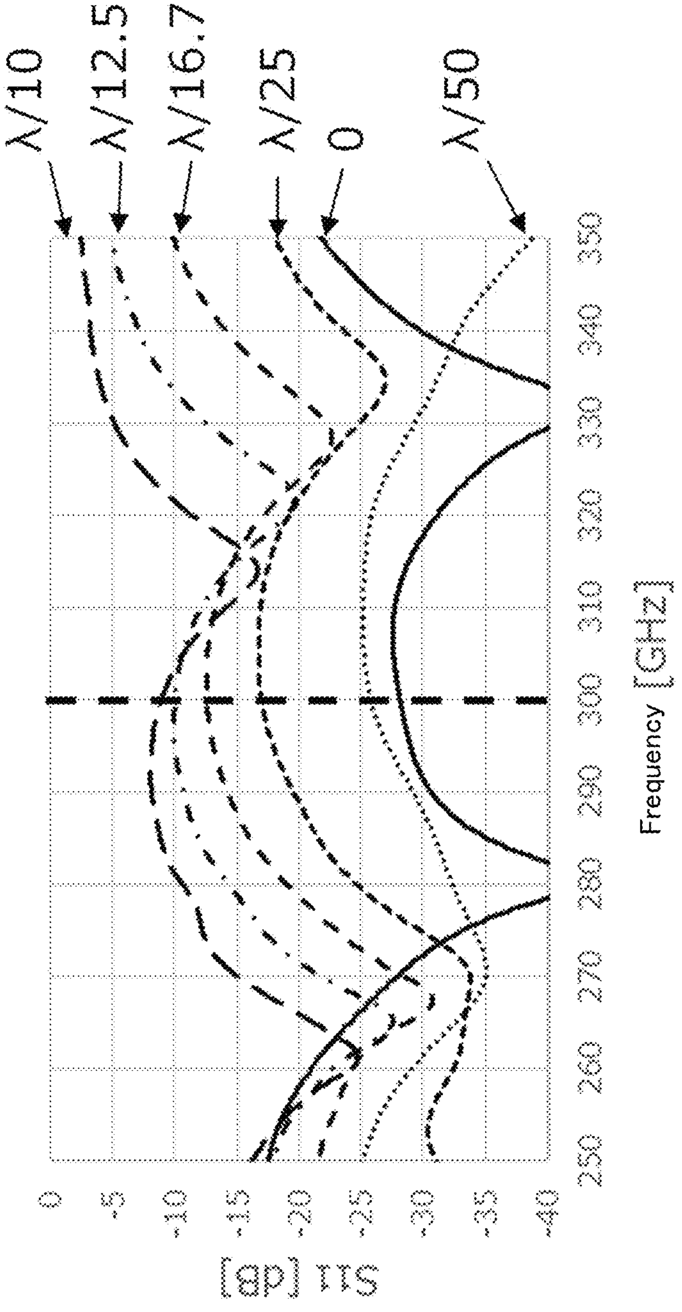
FIG. 25 illustrates a result of electromagnetic field simulation in terms of S11 with varying distance between an opening end portion and a via end in FIG. 4.

Referring to FIG. 25, the horizontal axis represents the frequency, and the vertical axis represents S11 (reflection) of the S parameters (Scattering parameters). The figure illustrates a result of electromagnetic field simulation in terms of S11 with varying spacing d between the opening end portion and the via ends in FIG. 4. Spacing d was varied to 0, $\lambda/50$, $\lambda/25$, $\lambda/16.7$, $\lambda/12.5$, and $\lambda/10$. Here, when the loss due to reflection is large, transmission is small.

Figure 26:
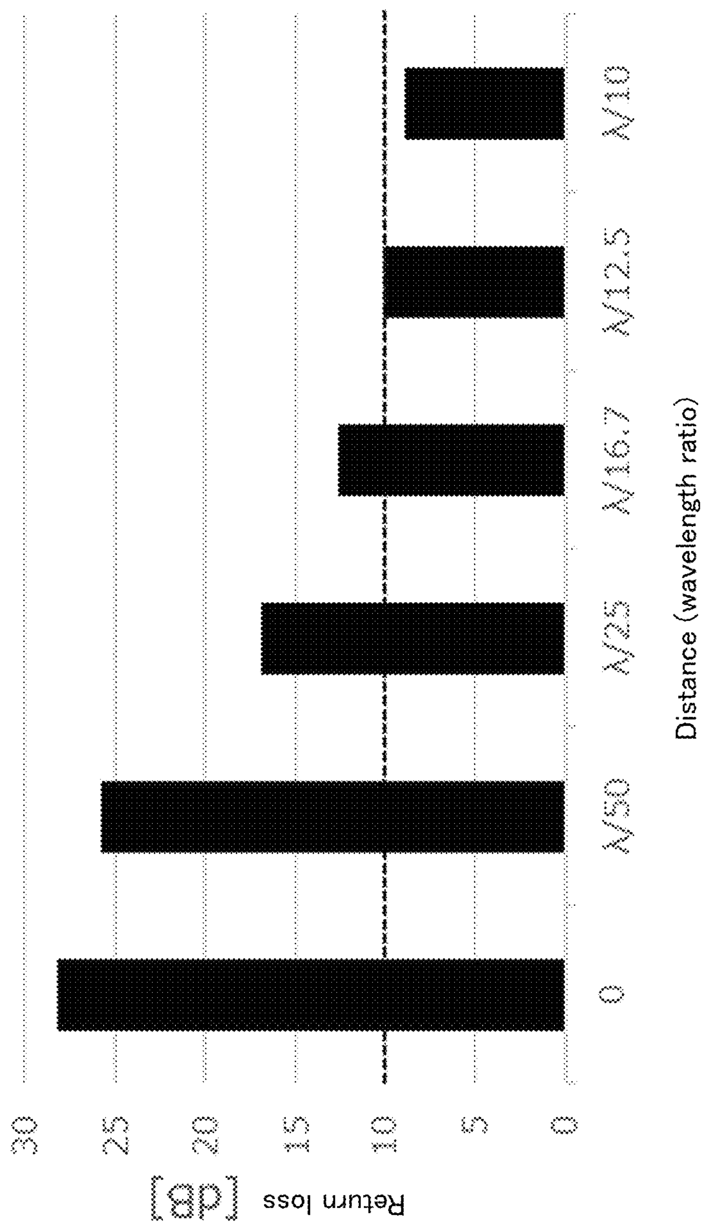
FIG. 26 illustrates a return loss for 300 GHz in FIG. 25 with varying distance between the opening end portion and the via end in FIG. 4.

Referring to FIG. 26, the return loss at 300 GHz in FIG. 25 is illustrated, where the horizontal axis represents the distance (wavelength ratio) as spacing d, and the vertical axis represents the return loss. When the threshold of the return loss is 10 dB, the return loss for $\lambda/10$ is equal to or less than the threshold. Thus, in the present embodiment, $\lambda/12$ or less is defined as the vicinity.

When power is input to waveguide 10, electric field 51 is generated in the direction of the short sides (parallel to the Y-axis in FIG. 1) of opening 14 as illustrated in FIG. 5. It is thus possible to transmit a signal in the lamination direction of dielectric layer 11 and copper foil layer 12.

Here, in the in-plane direction of the substrate, a first via group on the upper side in FIG. 5 and a second via group on the lower side in FIG. 5 are disposed in a direction orthogonal to the direction of electric field 51 of the signal propagating in the substrate thickness direction, and are disposed to face each other across opening 14 (Z direction in FIG. 5). Alternatively, vias 13 may be expressed as being arrayed in the in-plane direction of the substrate along two straight lines obtained by lengthening two straight line segments of opening 14 (long sides of a rectangle in this example) orthogonal to the direction of electric field 51 of the signal propagating in the substrate thickness direction.

When power is input to waveguide 10, the electric field is generated in a transverse direction of the opening regardless of the shape of the opening.

Comparative Example 1

Figure 6:
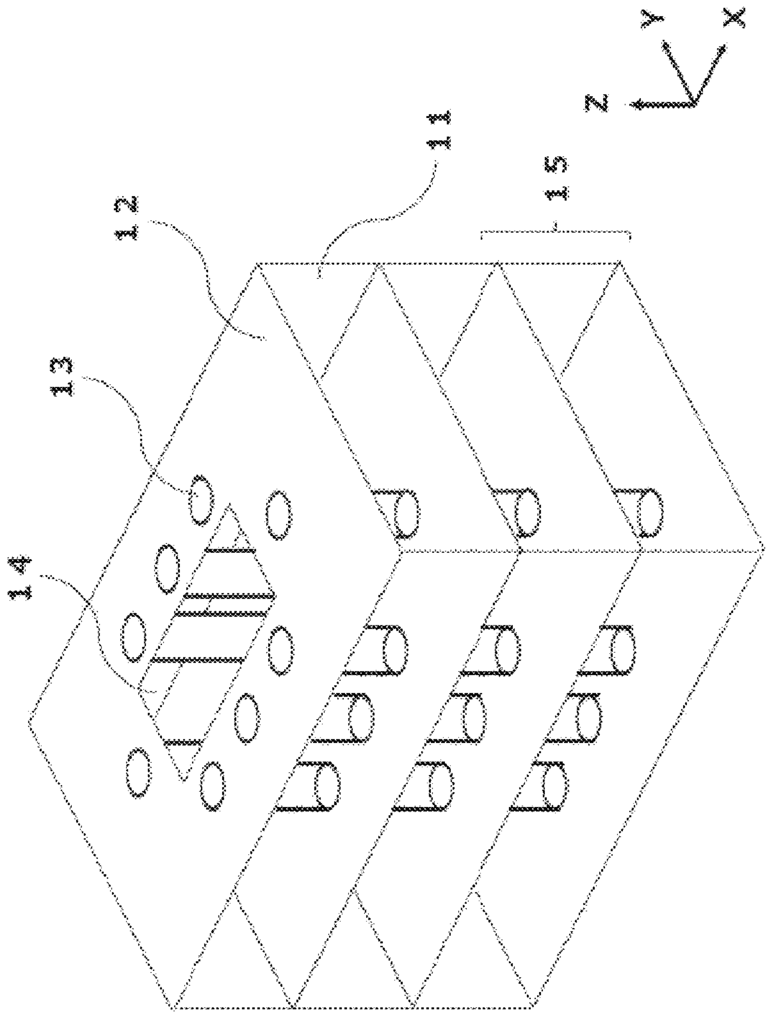
FIG. 6 Prior Art
FIG. 6 is a perspective view illustrating a waveguide according to Comparative Example 1.

FIG. 6 is a perspective view illustrating a waveguide according to a prior art example (Comparative Example 1). In Comparative Example 1, the same elements as those in Example 1 are denoted by the same reference numerals.

The difference between waveguide 10 according to Example 1 and the waveguide according to Comparative Example 1 is that vias 13 are also disposed in the vicinities of the short sides of opening 14 in the waveguide according to Comparative Example 1. In FIG. 6, two vias 13, one on each short side, are disposed in the vicinities of the short sides of opening 14.

Comparative Example 2

Figure 7:
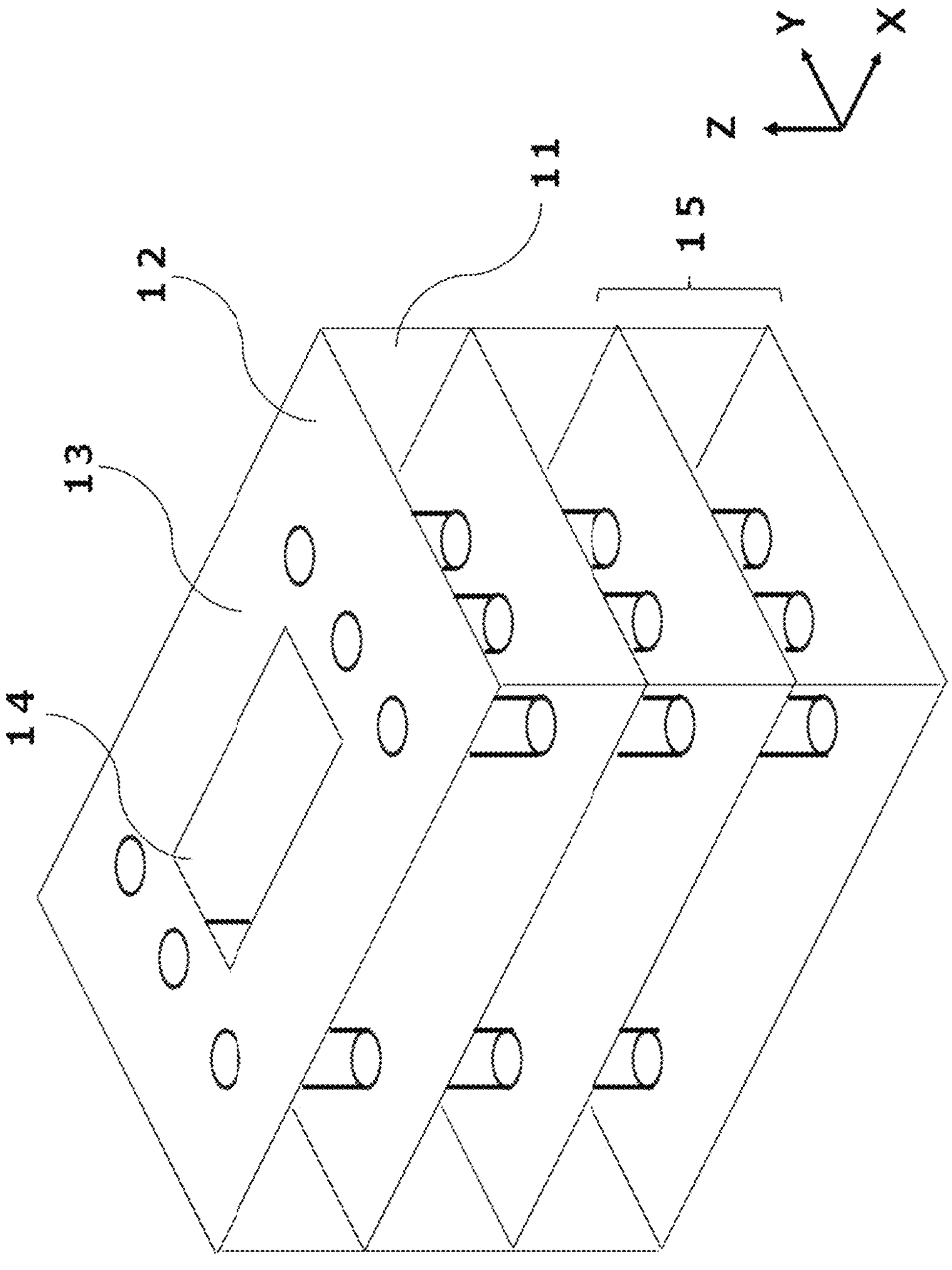
FIG. 7 is a perspective view illustrating a waveguide according to Comparative Example 2.

FIG. 7 is a perspective view illustrating a waveguide according to Comparative Example 2. In Comparative Example 2, the same elements as those in Example 1 are denoted by the same reference numerals.

The difference between waveguide 10 according to Example 1 and the waveguide according to Comparative Example 2 is that vias 13 are disposed in the short side direction of opening 14 in the waveguide according to Comparative Example 2. In FIG. 7, six vias 13, three on each short side, are disposed in the short side direction of opening 14.

Comparison Result 1

The present inventors analyzed and compared the band-pass characteristics and conductor loss of waveguide 10 according to Example 1, the waveguide according to Comparative Example 1, and the waveguide according to Comparative Example 2 by electromagnetic field simulation using the finite integration technique.

Figure 8:
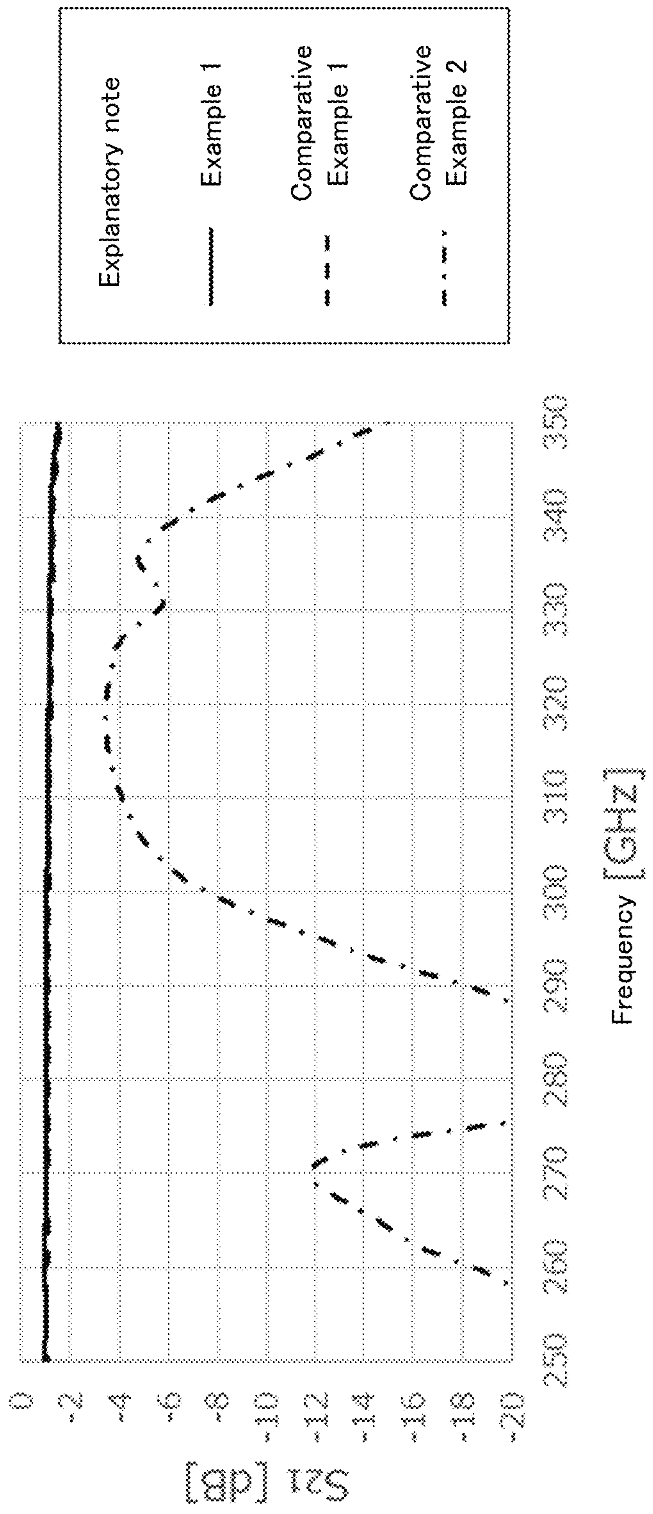
FIG. 8 illustrates a result of simulation of the band-pass characteristics of the waveguide according to Example 1, the waveguide according to Comparative Example 1, and the waveguide according to Comparative Example 2.

FIG. 8 illustrates the result of simulation of the band-pass characteristics of waveguide 10 according to Example 1, the waveguide according to Comparative Example 1, and the waveguide according to Comparative Example 2. In FIG. 8, the horizontal axis represents the frequency (unit: GHz), and the vertical axis represents S21 (unit: dB) which is an S parameter indicating the band-pass characteristics.

From FIG. 8, it can be seen that the band-pass characteristics of the waveguide according to Comparative Example 2 are worse than the band-pass characteristics of waveguide 10 according to Example 1 and the waveguide according to Comparative Example 1. Therefore, it can be seen that the waveguide according to Comparative Example 2 has a large loss, and the signal does not easily passes through the waveguide.

On the other hand, the band-pass characteristics of waveguide 10 according to Example 1 and the band-pass characteristics of the waveguide according to Comparative Example 1 do not appear to be significantly different from each other in FIG. 8.

Figure 9:
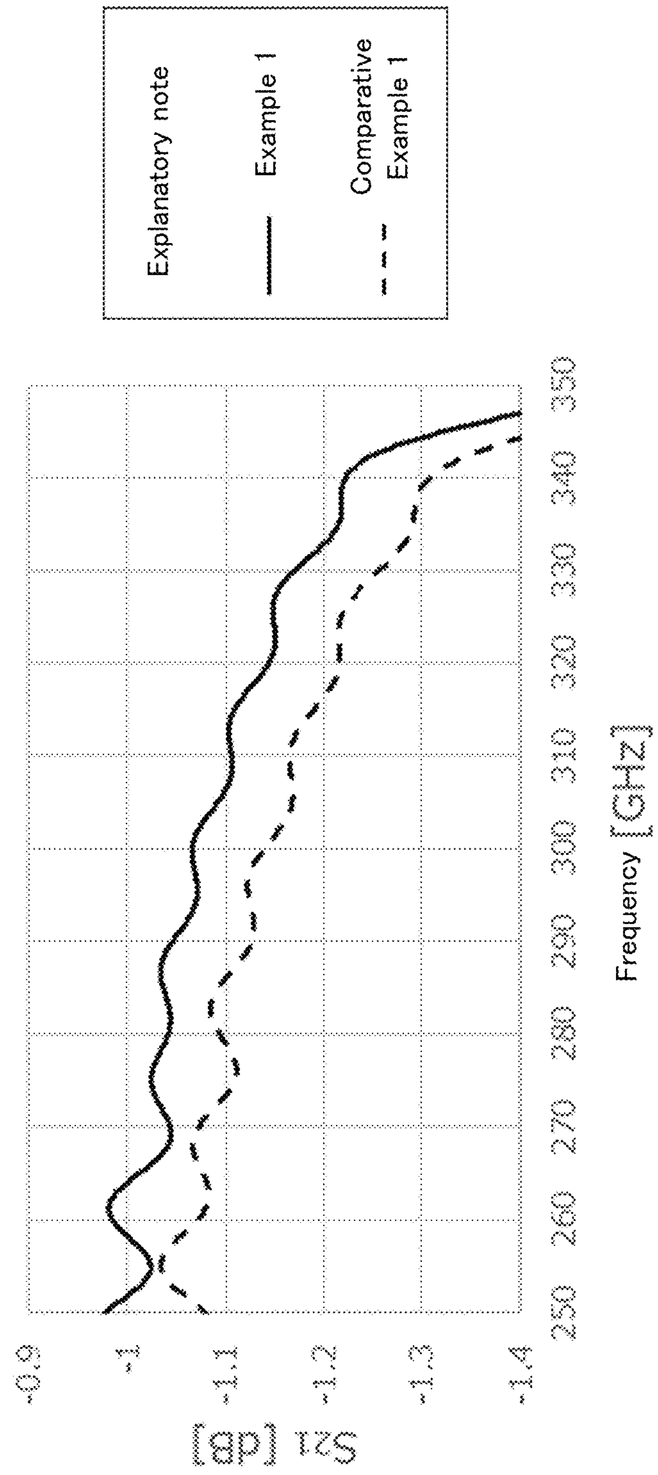
FIG. 9 illustrates the result of simulation of the band-pass characteristics of the waveguide according to Example 1 and the waveguide according to Comparative Example 1.

FIG. 9 illustrates the result of simulation of the band-pass characteristics of the waveguide according to Example 1 and the waveguide according to Comparative Example 1, in which the scale of the vertical axis is changed from that of FIG. 8. In FIG. 9, the horizontal axis represents the frequency (unit: GHz), and the vertical axis represents S21 (unit: dB).

It can be seen from FIG. 9 that waveguide 10 according to Example 1 has a larger S21 value and a smaller loss. Therefore, from the viewpoint of the band-pass characteristics, it can be seen that waveguide 10 according to Example 1 is superior to the waveguide according to Comparative Example 1.

Figure 10:
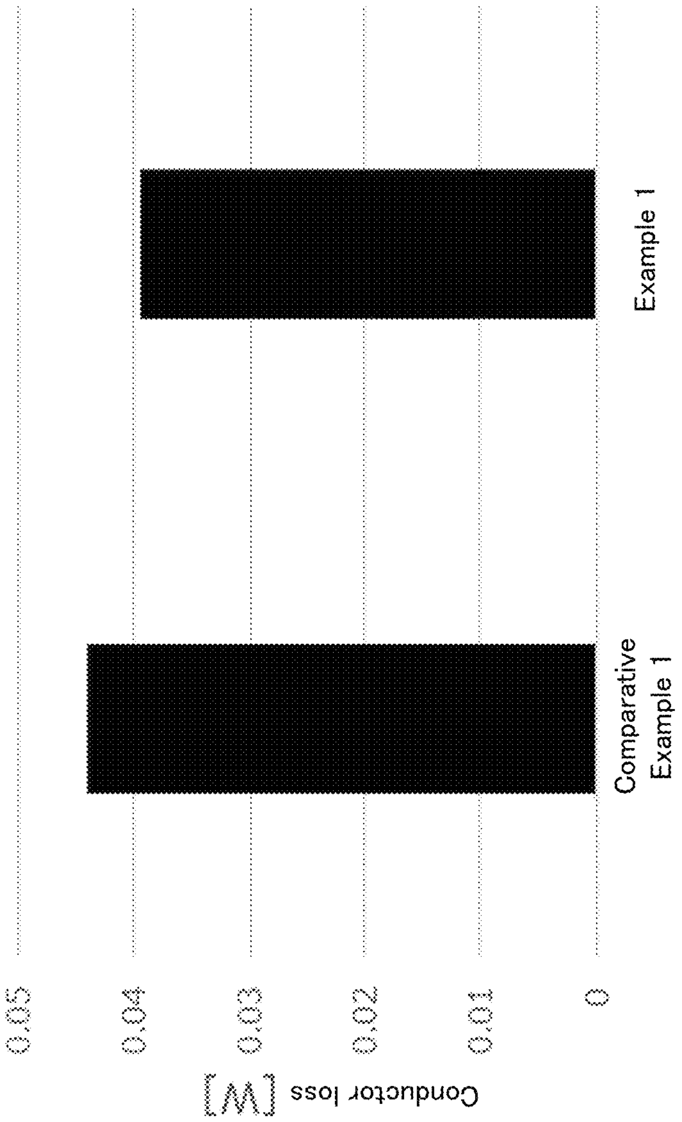
FIG. 10 illustrates a result of simulation of conductor loss in the waveguide according to Example 1 and the waveguide according to Comparative Example 1.

FIG. 10 illustrates a result of simulation of conductor loss in waveguide 10 according to Example 1 and the waveguide according to Comparative Example 1. Specifically, FIG. 10 illustrates the simulation result obtained by extracting the conductor loss from loss components for 300 GHz caused when the power of 0.5 W is inputted. In FIG. 10, the vertical axis represents conductor loss (unit: W).

For 300 GHz, it can be seen from FIG. 10 that the conductor loss of waveguide 10 according to Example 1 is smaller than the conductor loss of the waveguide according to Comparative Example 1, and that waveguide 10 according to Example 1 successfully suppressed the conductor loss. It can be seen that waveguide 10 according to the present Example is superior to the waveguide according to the comparative example 1 from the viewpoint of conductor loss.

Figure 11:
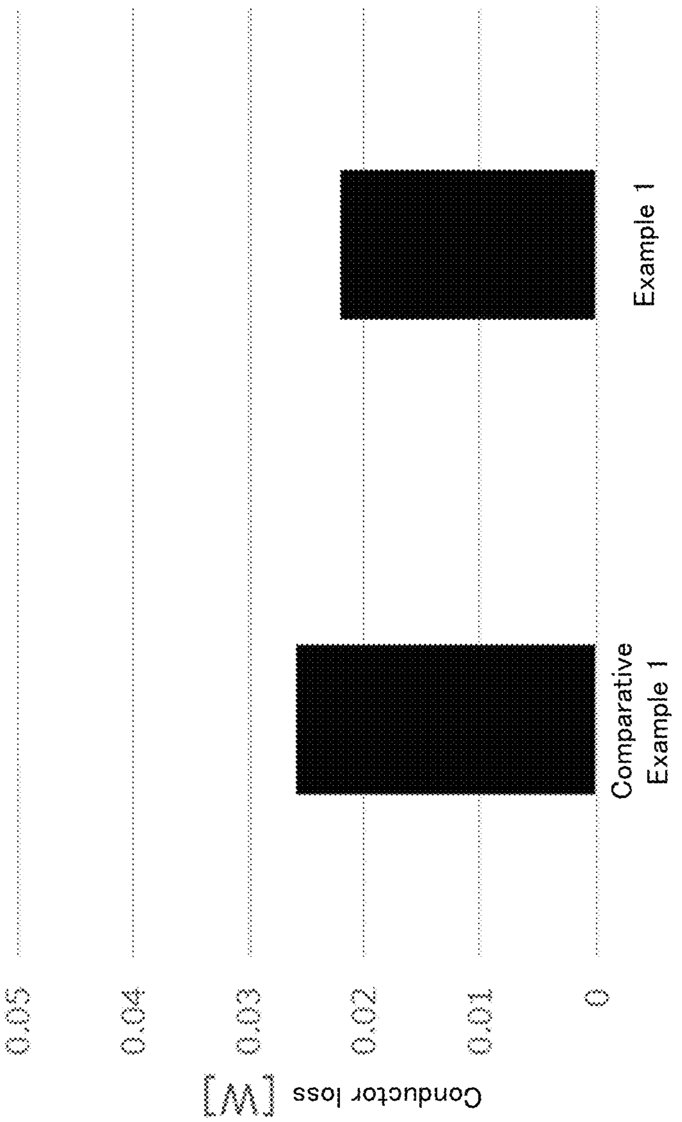
FIG. 11 illustrates another result of simulation of conductor loss in the waveguide according to Example 1 and the waveguide according to Comparative Example 1.

FIG. 11 illustrates another result of simulation of conductor loss in waveguide 10 according to Example 1 and the waveguide according to Comparative Example 1. Specifically, FIG. 11 illustrates the simulation result obtained by extracting the conductor loss from loss components for 200 GHz caused when the power of 0.5 W is inputted. In FIG. 11, the vertical axis represents conductor loss (unit: W).

Also for 200 GHz, it can be seen from FIG. 11 that the conductor loss of waveguide 10 according to Example 1 is smaller than the conductor loss of the waveguide according to Comparative Example 1, and that waveguide 10 according to Example 1 successfully suppressed the conductor loss. It can be seen that waveguide 10 according to the Example is superior to the waveguide according to Comparative Example 1 from the viewpoint of conductor loss for 200 GHz.

Figure 12:
FIG. 12 illustrates still another result of simulation of conductor loss in the waveguide according to Example 1 and Comparative Example 1.

FIG. 12 illustrates still another result of simulation of conductor loss in waveguide 10 according to Example 1 and the waveguide according to Comparative Example 1. Specifically, FIG. 12 illustrates the simulation result obtained by extracting the conductor loss from loss components for 100 GHz caused when the power of 0.5 W is inputted. In FIG. 12, the vertical axis represents conductor loss (unit: W).

Also for 100 GHz, it can be seen from FIG. 12 that the conductor loss of waveguide 10 according to Example 1 is smaller than the conductor loss of the waveguide according to Comparative Example 1, and that waveguide 10 according to Example 1 successfully suppressed the conductor loss. It can be seen that waveguide 10 according to the Example is superior to the waveguide according to Comparative Example 1 from the viewpoint of conductor loss for 100 GHz.

The reason why the conductor loss increases with increasing frequency as illustrated in FIGS. 10 to 12 is that the equivalent resistance increases due to the skin effect.

As described above, the configuration of waveguide 10 according to Example 1 is effective at a frequency equal to or higher than 100 GHz. This is because the total amount of current flowing around waveguide 10 is reduced by the configuration of waveguide 10 according to Example 1.

Next, Example 2 according to Embodiment 1 and Comparative Example 3 in a case where the total numbers of vias 13 are the same between the present example and the comparative example will be considered.

Example 2

Figure 13:
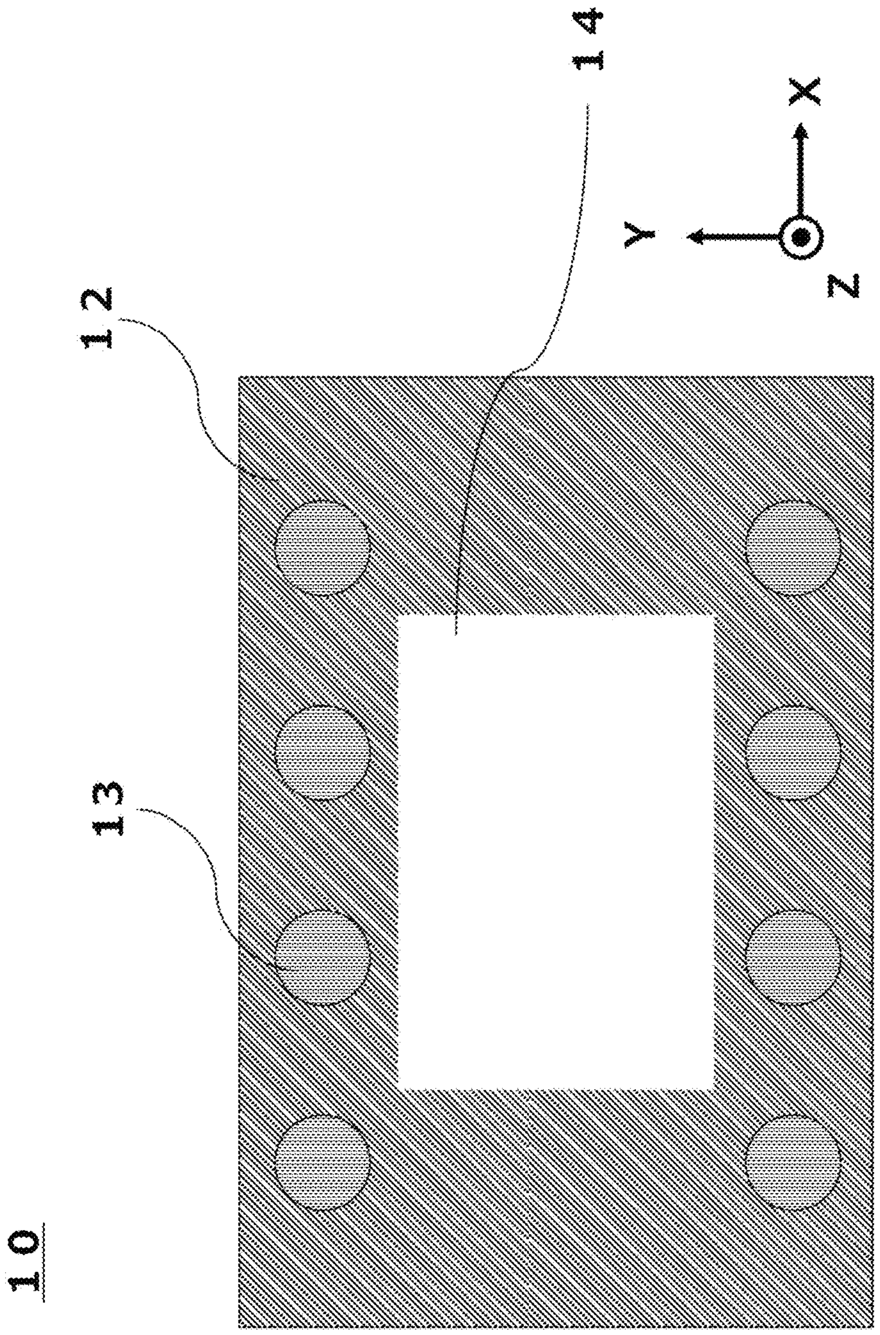
FIG. 13 is a plan view illustrating a waveguide according to Example 2 of Embodiment 1 as seen in the Z-axis positive direction.

FIG. 13 is a plan view illustrating waveguide 10 according to Example 2 of Embodiment 1 as seen in the Z-axis positive direction. In Example 2, the same elements as those of Example 1 are denoted by the same reference numerals. The difference between waveguide 10 according to Example 1 and waveguide 10 according to Example 2 is that, in waveguide 10 according to Example 2, vias 13, four on each side, are disposed along the straight lines obtained by lengthening the long sides.

Comparative Example 3

Figure 14:
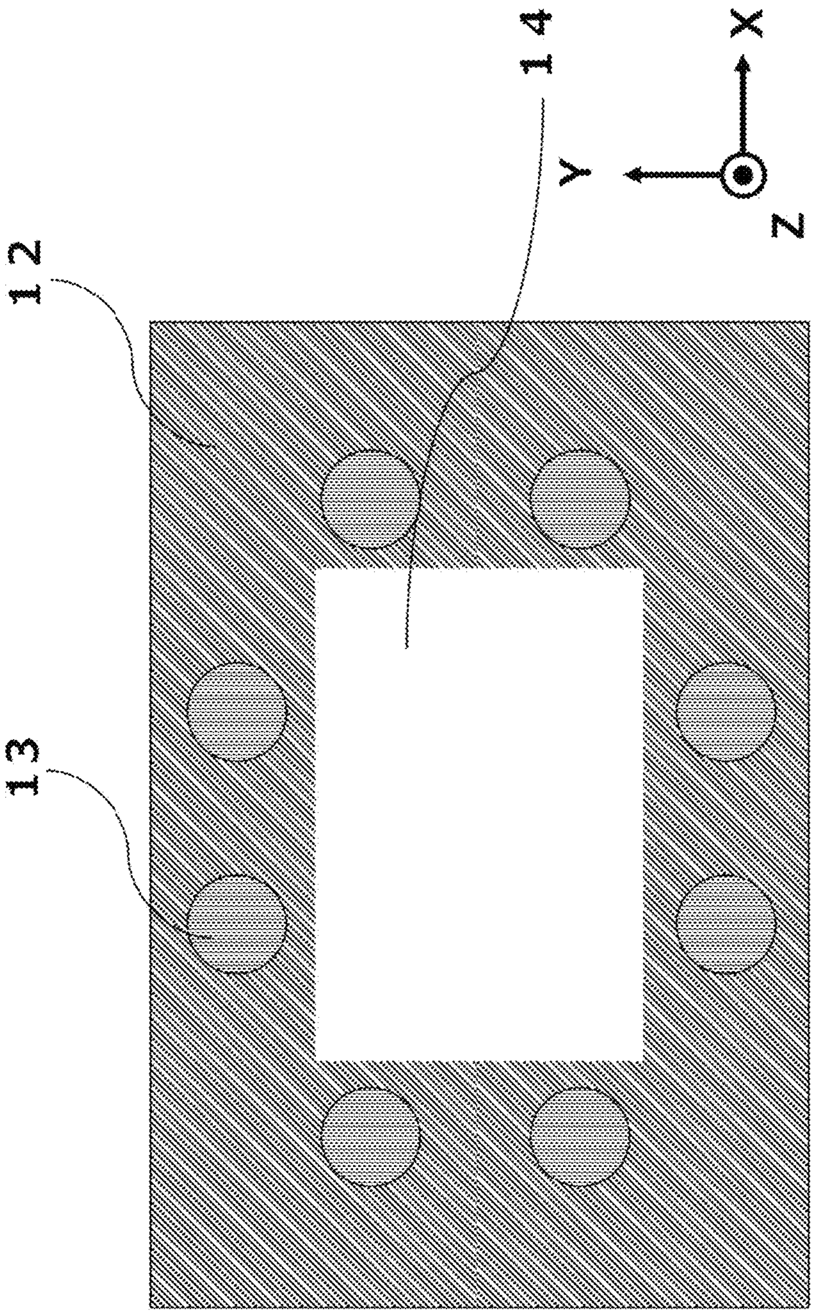
FIG. 14 is a plan view illustrating a waveguide according to Comparative Example 3 as seen in the Z-axis positive direction.

FIG. 14 is a plan view illustrating another waveguide according to Comparative Example 3 as seen in the Z-axis positive direction. In Comparative Example 3, the same elements as those in Example 1 are denoted by the same reference numerals. The difference between waveguide 10 according to Example 2 and waveguide 10 according to Comparative Example 3 is that two vias 13 disposed at the opposite ends of each of the two long sides of waveguide 10 according to Example 2 are respectively disposed in the vicinities of the two short sides.

Comparison Result 2

As described above, the present inventors analyzed and compared the band-pass characteristics of waveguide 10 according to Example 2 and the waveguide according to Comparative Example 3 by electromagnetic field simulation using the finite integration technique.

Figure 15:
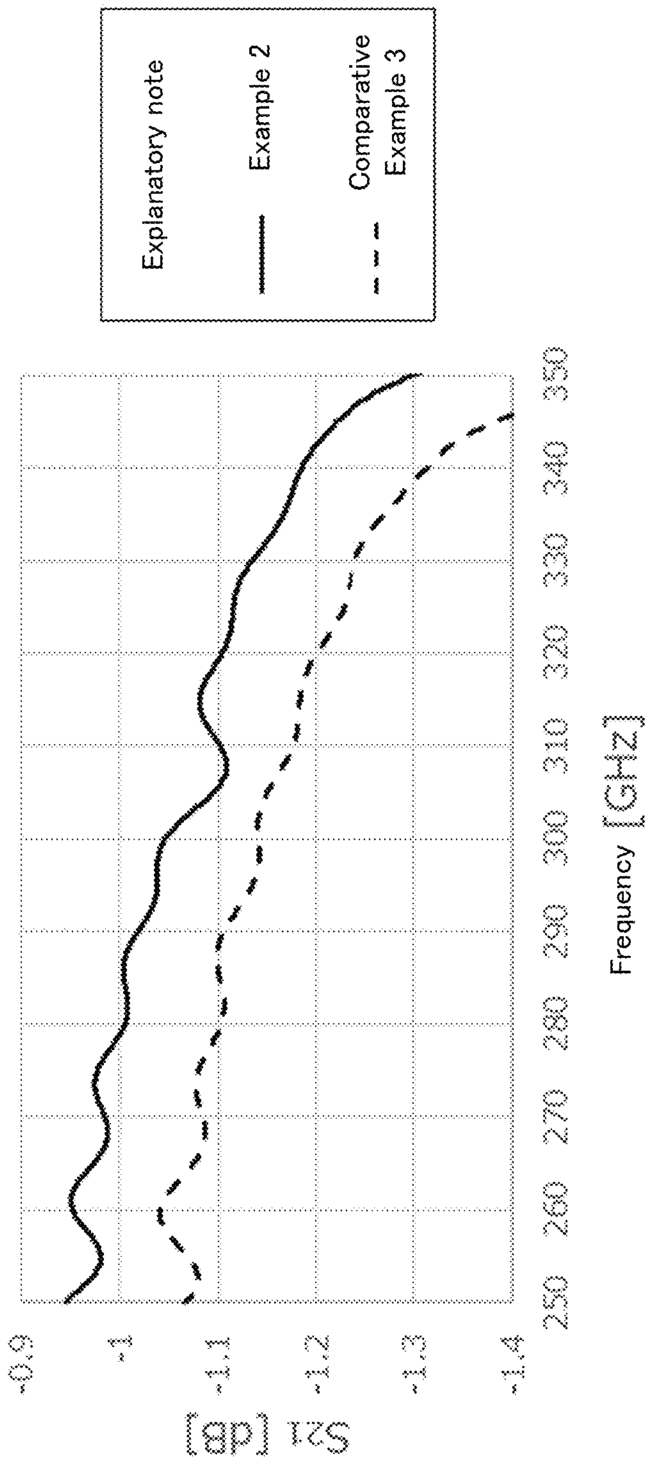
FIG. 15 illustrates a result of simulation of the band-pass characteristics of the waveguide according to Example 2 and the waveguide according to Comparative Example 3.

FIG. 15 illustrates a result of simulation of the band-pass characteristics of waveguide 10 according to Example 2 and the waveguide according to Comparative Example 3. In FIG. 15, the horizontal axis represents the frequency (unit: GHz), and the vertical axis represents S21 (unit: dB).

From FIG. 15, it can be seen that waveguide 10 according to Example 2 has a larger S21 value and a smaller loss. Accordingly, it can be understood that waveguide 10 according to Example 2 is superior to the waveguide according to Comparative Example 3.

As is illustrated, even when the total numbers of vias 13 are the same, the loss is smaller when the vias are arrayed in the long side direction of opening 14. It is thus understood that the reduction in the loss is the effect by the array direction of vias 13.

Figure 16:
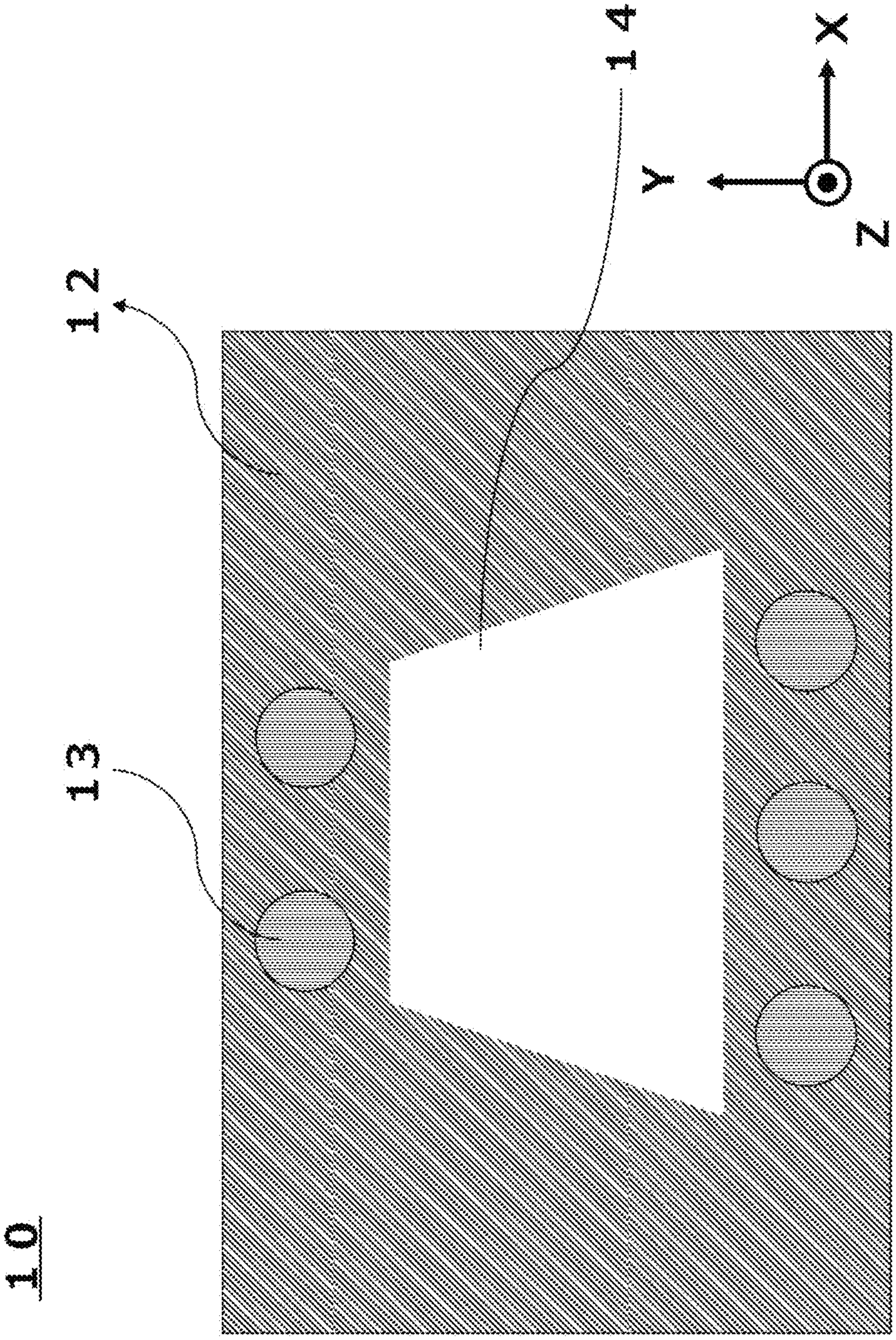
FIG. 16 is a plan view illustrating a waveguide according to Example 3 of Embodiment 1 as seen in the Z-axis positive direction.
Figure 17:
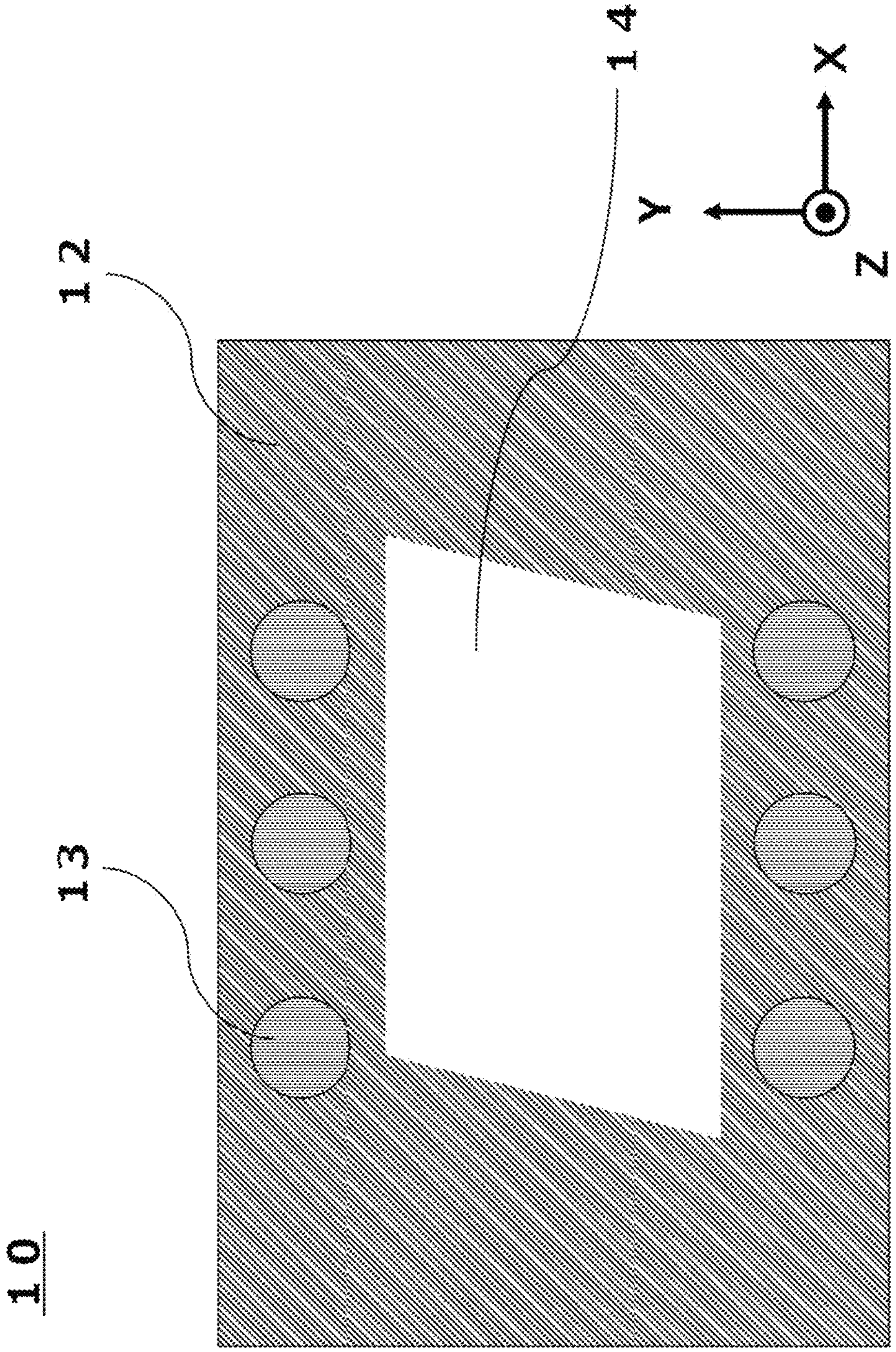
FIG. 17 is a plan view illustrating a waveguide according to Example 4 of Embodiment 1 as seen in the Z-axis positive direction.
Figure 18:
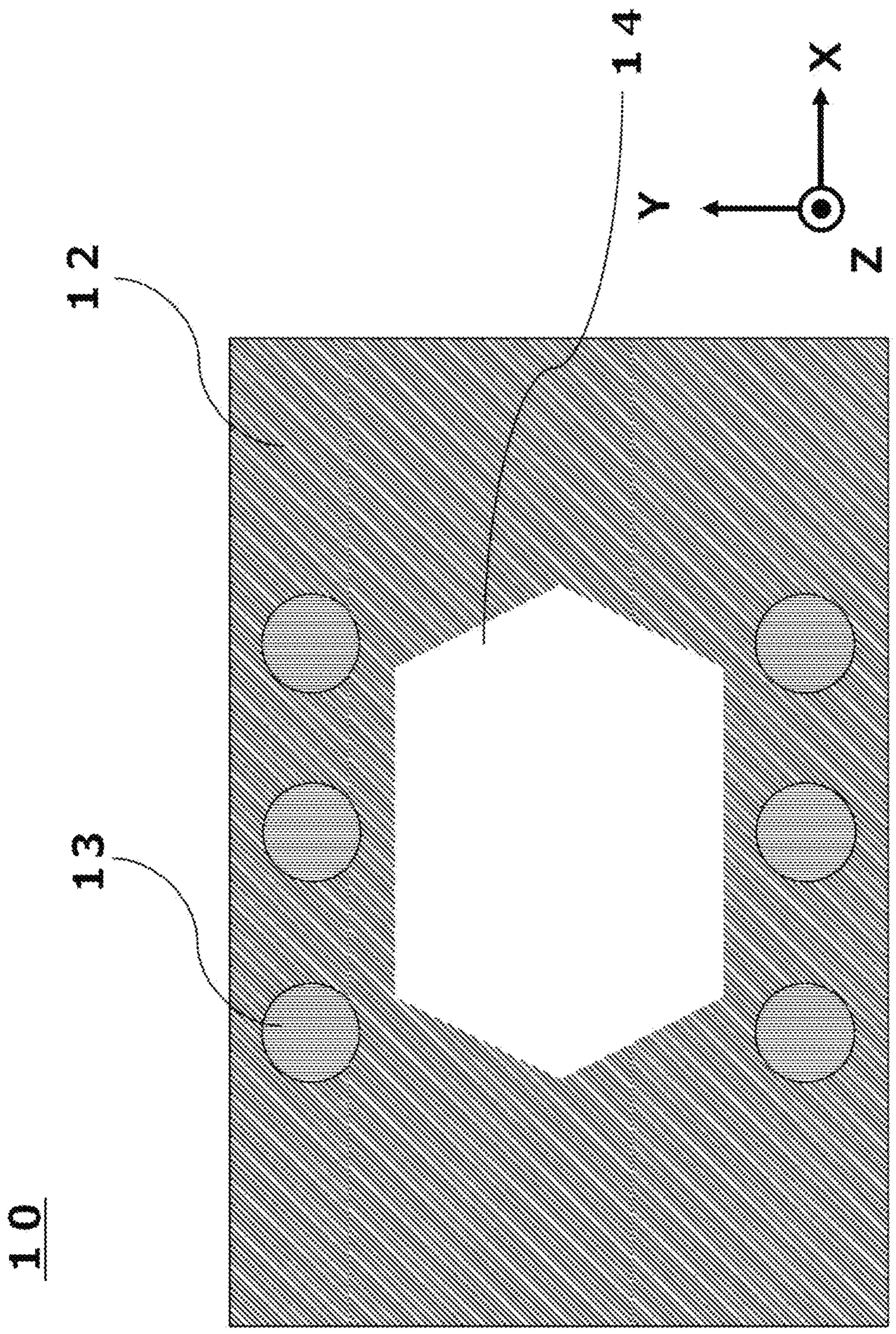
FIG. 18 is a plan view illustrating a waveguide according to Example 5 of Embodiment 1 as seen in the Z-axis positive direction.
Figure 19:
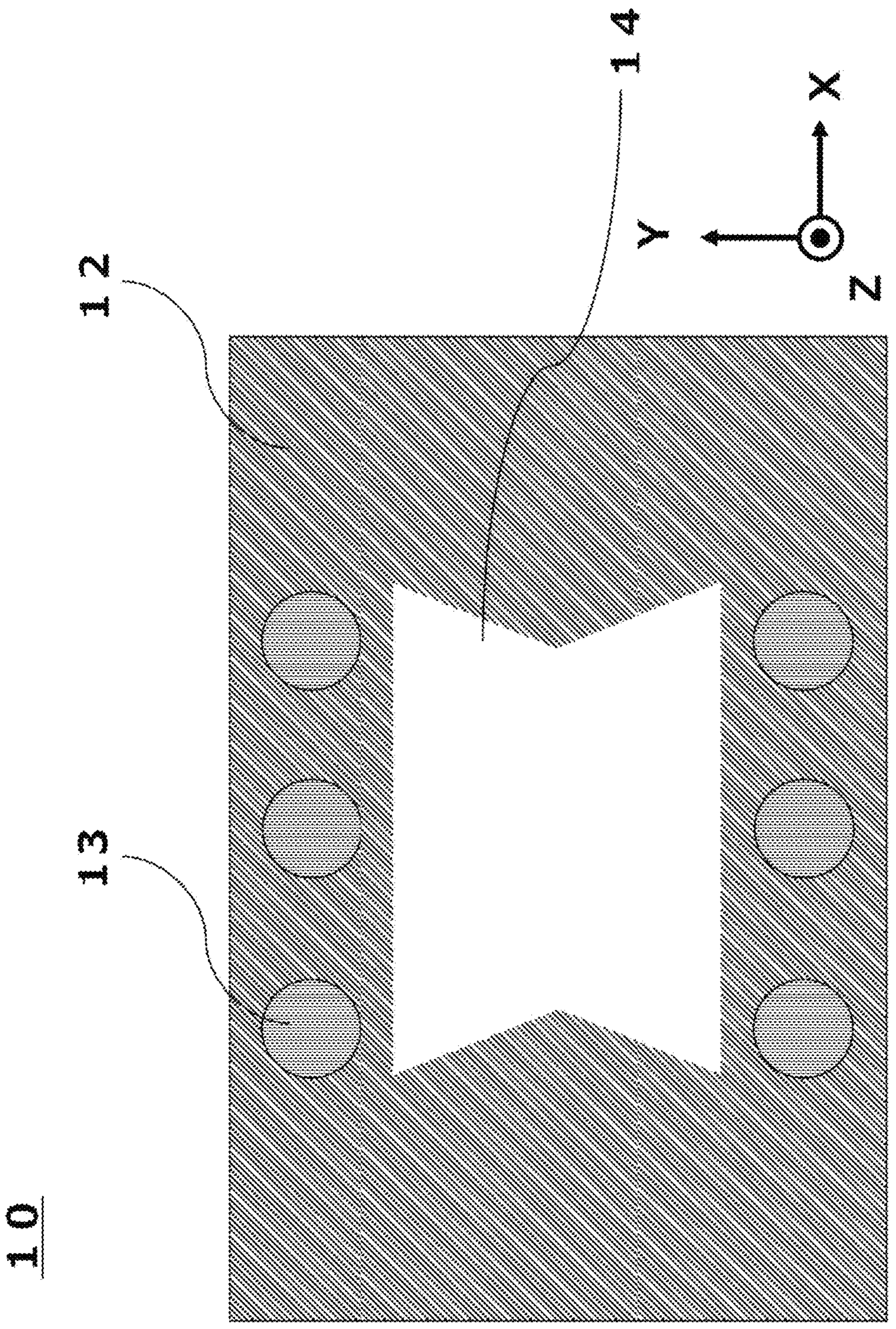
FIG. 19 is a plan view illustrating a waveguide according to Example 6 of Embodiment 1 as seen in the Z-axis positive direction.
Figure 20:
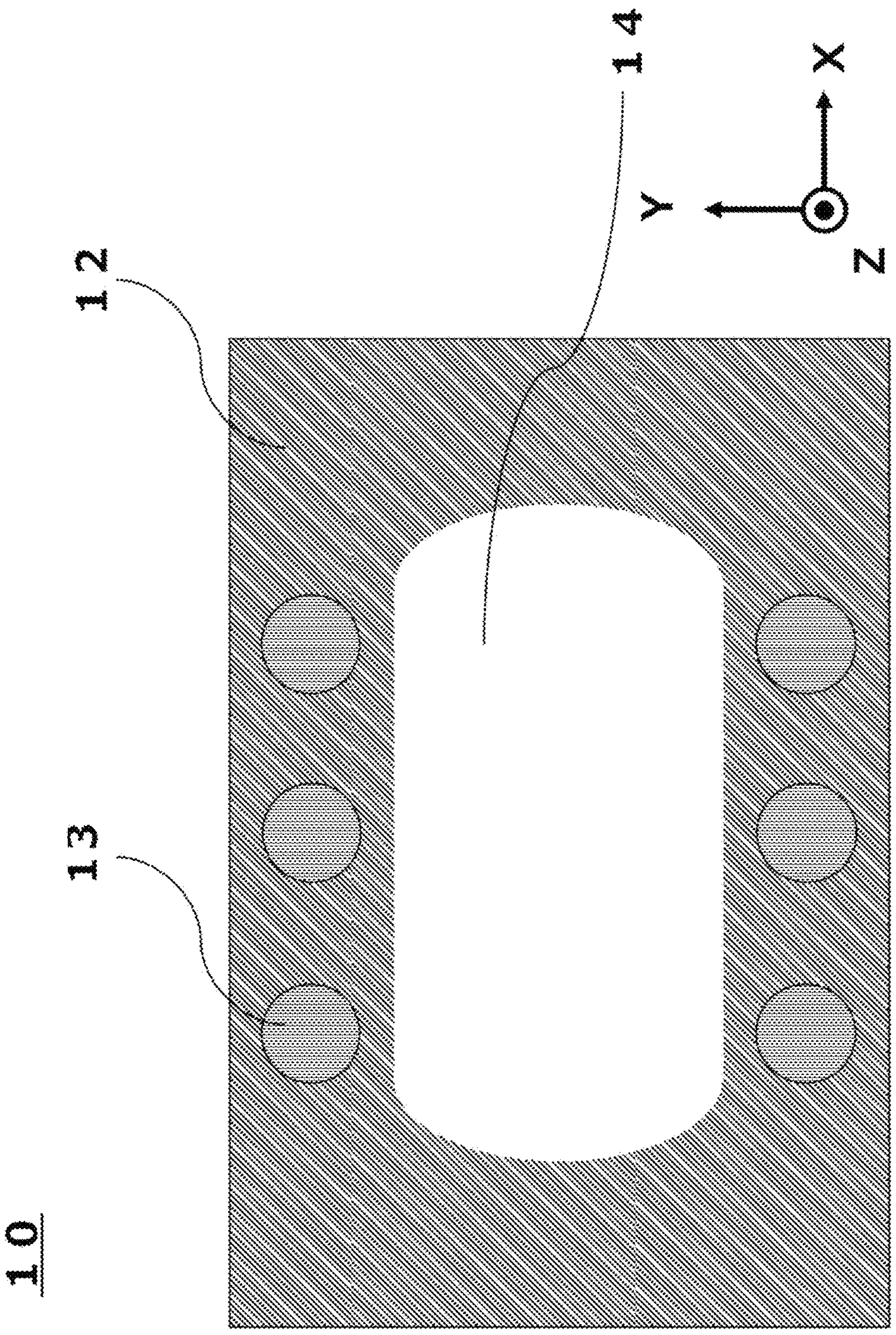
FIG. 20 is a plan view illustrating a waveguide according to Example 7 of Embodiment 1 as seen in the Z-axis positive direction.

The examples have been described above in which the shape of opening 14 is a rectangle as illustrated in FIG. 4 and the like, but the present disclosure is not limited thereto. For example, the shape of opening 14 may be a trapezoid (Example 3) as illustrated in FIG. 16, a parallelogram (Example 4) as illustrated in FIG. 17, a hexagon (Example 5) as illustrated in FIG. 18, or any polygon (Example 6) including an obtuse angle at an inner angle as illustrated in FIG. 19. Further, for example, the shape of opening 14 may be any shape (Example 7) having no apex as illustrated in FIG. 20. In these Examples 3 to 7, an electric field is generated in a direction parallel to the Y-axis, and a signal can be transmitted in the lamination direction of dielectric layer 11 and copper foil layer 12.

Here, in the in-plane direction of the substrate, the first via group on the upper side in these figures and the second via group on the lower side in these figures are disposed in a direction orthogonal to the direction of electric field 51 of the signal propagating in the substrate thickness direction, and are disposed to face each other across opening 14. Alternatively, vias 13 may be expressed as being arrayed in the in-plane direction of the substrate along two straight lines obtained by lengthening two straight line segments of opening 14 (straight line segments extending in the X-axis direction in these examples) orthogonal to the direction of the electric field of the signal propagating in the substrate thickness direction.

Having such configurations, Examples 3 to 7 have the same effects as those of Examples 1 and 2.

Embodiment 2

Hereinafter, Embodiment 2 of the present disclosure will be described with reference to FIGS. 21 and 22. In the following, the same elements as those of Embodiment 1 are denoted by the same reference numerals, and differences from Embodiment 1 will be described.

Configuration of Waveguide

Figure 21:
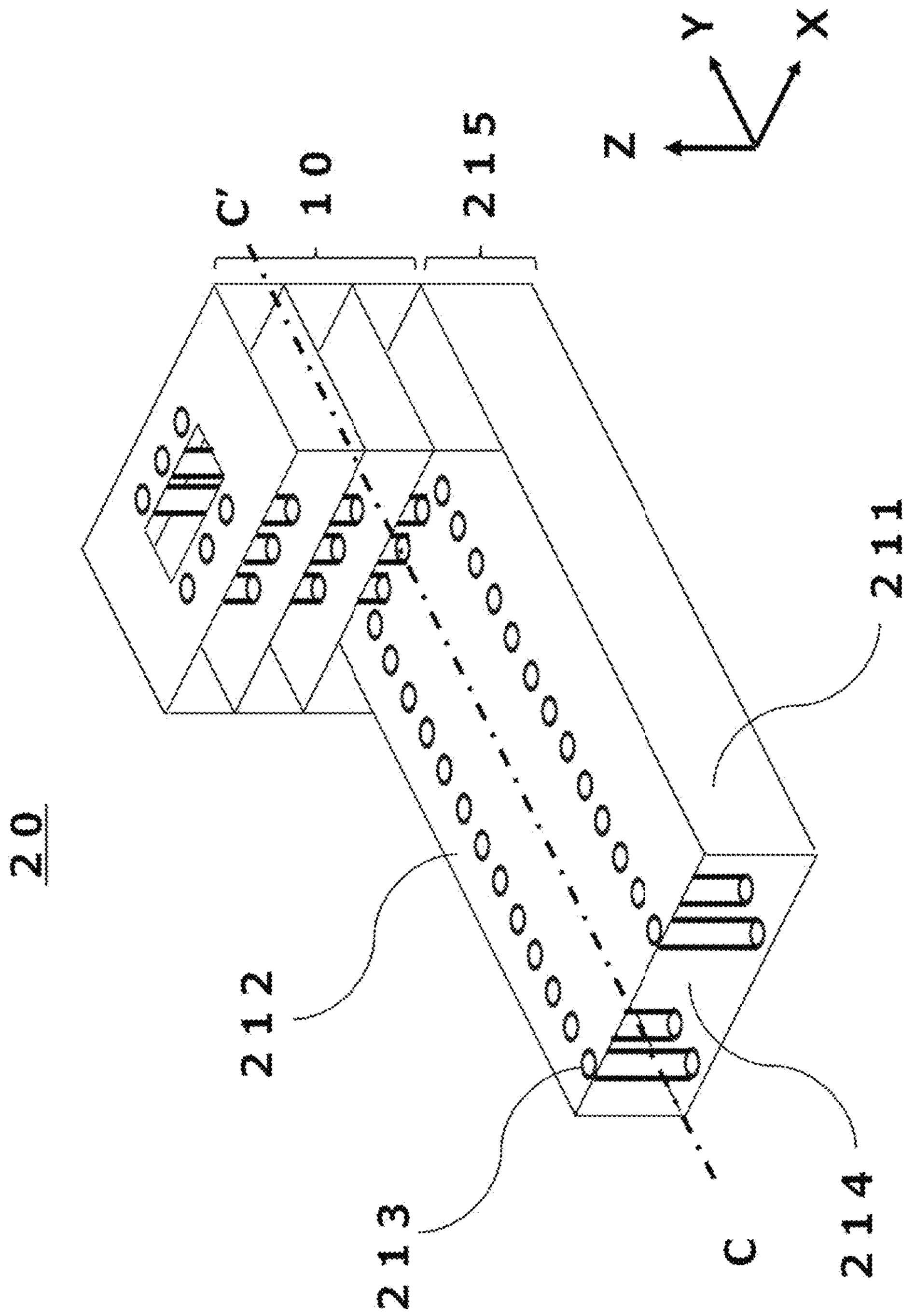
FIG. 21 is a perspective view illustrating a waveguide according to Embodiment 2 of the present disclosure.
Figure 22:
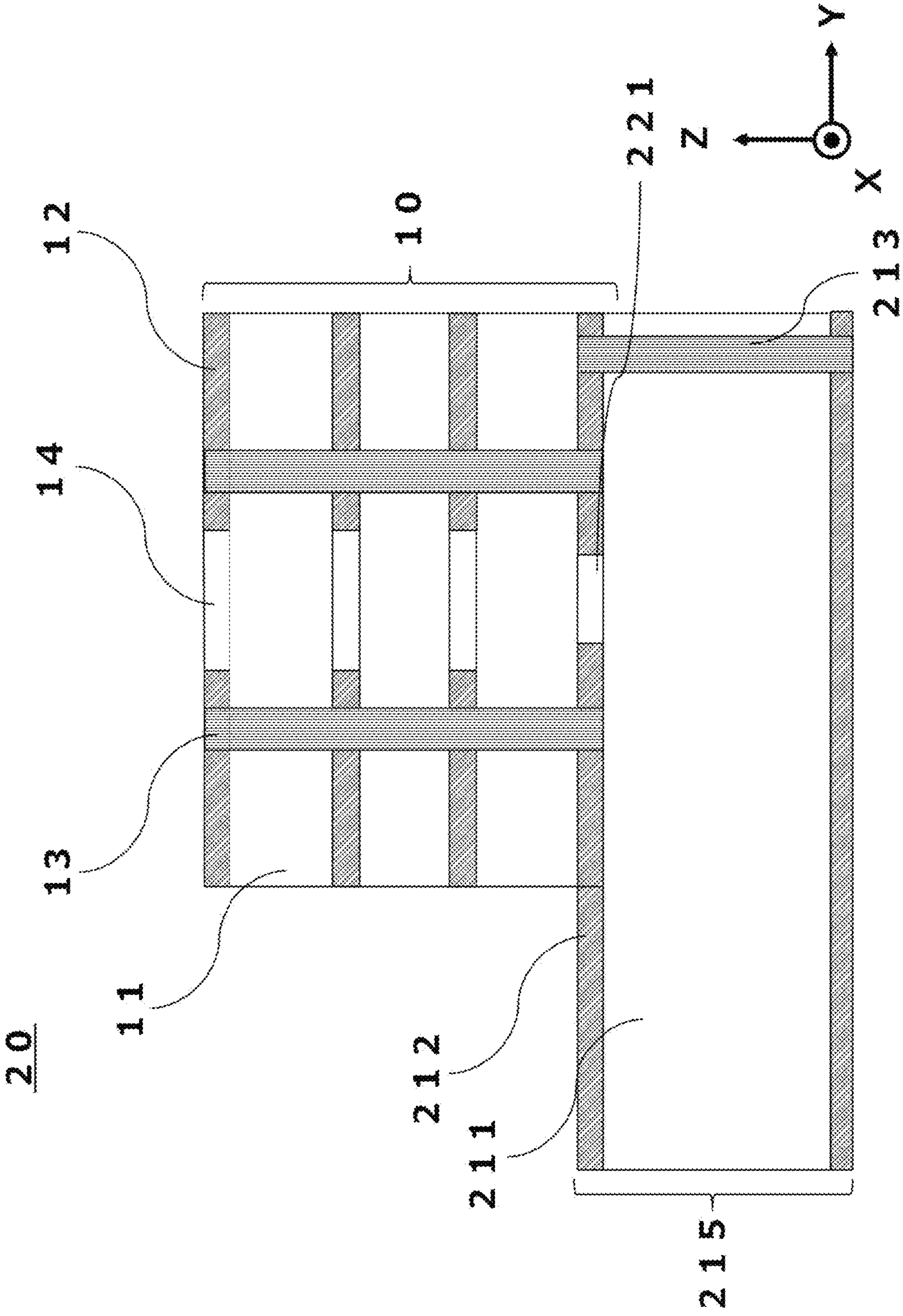
FIG. 22 is a sectional view of the waveguide according to Embodiment 2 taken along line C-C'.

FIG. 21 is a perspective view illustrating waveguide 20 according to Embodiment 2, and FIG. 22 is a sectional view of waveguide 20 taken along line C-C'.

Waveguide 20 includes waveguide 10 according to Embodiment 1 and post-wall waveguide 215. As illustrated in FIG. 21, waveguide 10 and post-wall waveguide 215 may be formed in an L-shape, and waveguide 20 may be referred to as an L-shaped waveguide. Note that post-wall waveguide 215 may be connected to an upper portion of waveguide 10 or may be connected to a lower portion of waveguide 10.

Post-wall waveguide 215 includes dielectric layer 211, copper foil layers 212, and a plurality of vias 213.

Copper foil layer 212 on the lower surface of post-wall waveguide 215, dielectric layer 211, and copper foil layer 212 on the upper surface of post-wall waveguide 215 are laminated in this order to form a laminated substrate.

The plurality of vias 213 electrically connect copper foil layers 212 to each other and penetrate through dielectric layer 211 and copper foil layers 212. The plurality of vias 213 are arrayed at a spacing equal to or less than $\lambda e/2$ to form two sidewalls.

As described above, the electromagnetic wave is confined by copper foil layers 212 formed on the opposite surfaces (upper surface and lower surface) of the laminated substrate in which post-wall waveguide 215 is formed, and by vias 213. It is thus possible to allow the electromagnetic wave to be propagated (it is possible to transmit a signal) in the array direction (substrate horizontal direction) of the plurality of vias 213 in the substrate.

As illustrated in FIG. 22, post-wall waveguide 215 is connected to waveguide 10 via connection opening 221. Opening 14 as seen in the Z-axis direction in FIG. 22 includes connection opening 221, and the area of connection opening 221 is smaller than the area of opening 14. It is thus possible to reduce reflection of electromagnetic waves and achieve impedance matching. It is preferable that the shape of connection opening 221 and the shape of opening 14 be similar to each other.

Since waveguide 20 is formed by combining waveguide 10 that transmits a signal in the substrate thickness direction and post-wall waveguide 215 that transmits a signal in the substrate horizontal direction via opening 214, the transmission direction of the signal can be converted by 90 degrees in the substrate.

Embodiment 3

Hereinafter, Embodiment 3 of the present disclosure will be described with reference to FIGS. 23 and 24. In the following, the same elements as those of Embodiment 1 are denoted by the same reference numerals, and differences from Embodiment 1 will be described.

Configuration of Waveguide

Example 8

Figure 23:
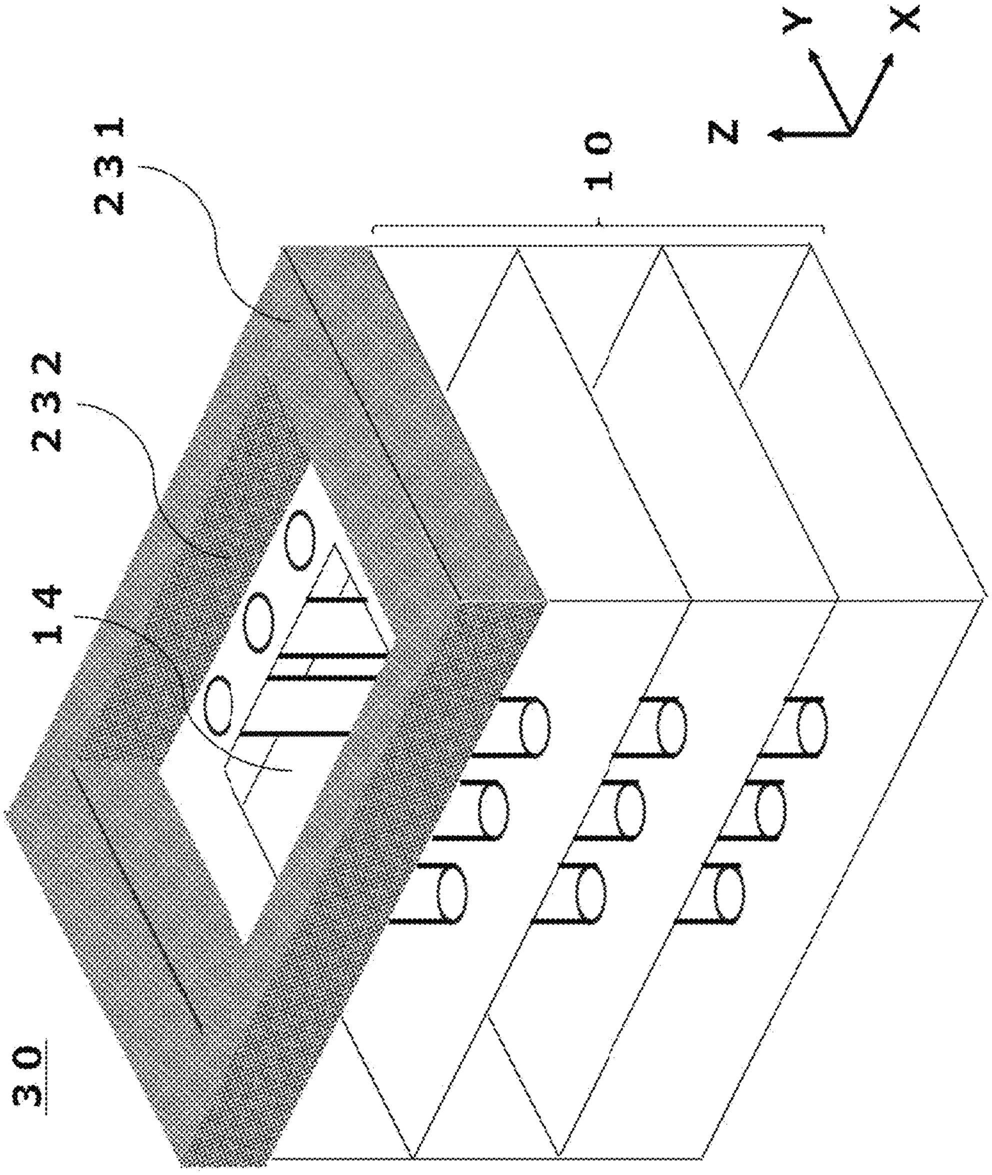
FIG. 23 is a perspective view illustrating a waveguide according to Example 8 of Embodiment 3 of the present disclosure.

FIG. 23 is a perspective view illustrating waveguide 30 according to Example 8 of Embodiment 3 of the present disclosure.

Waveguide 30 includes waveguide 10 according to Embodiment 1 and conductor (hereinafter, referred to as "cavity") 231. Cavity 231 includes opening 232 having a rectangular shape. Cavity 231 may be connected to the upper portion of waveguide 10 or may be connected to the lower portion of waveguide 10.

Opening 232 may be filled with a dielectric or may be filled with air. The area of opening 232 is larger than the area of opening 14, and opening 232 as seen in the Z-axis direction in FIG. 23 includes opening 14. Thus, it becomes possible to transmit and receive radio waves through opening 232. Therefore, waveguide 30 may be used as an antenna. Note that the shape of opening 14 and the shape of opening 232 need not be similar to each other. For example, the aspect ratio of opening 14 and the aspect ratio of opening 232 may be different from each other.

Example 9

Figure 24:
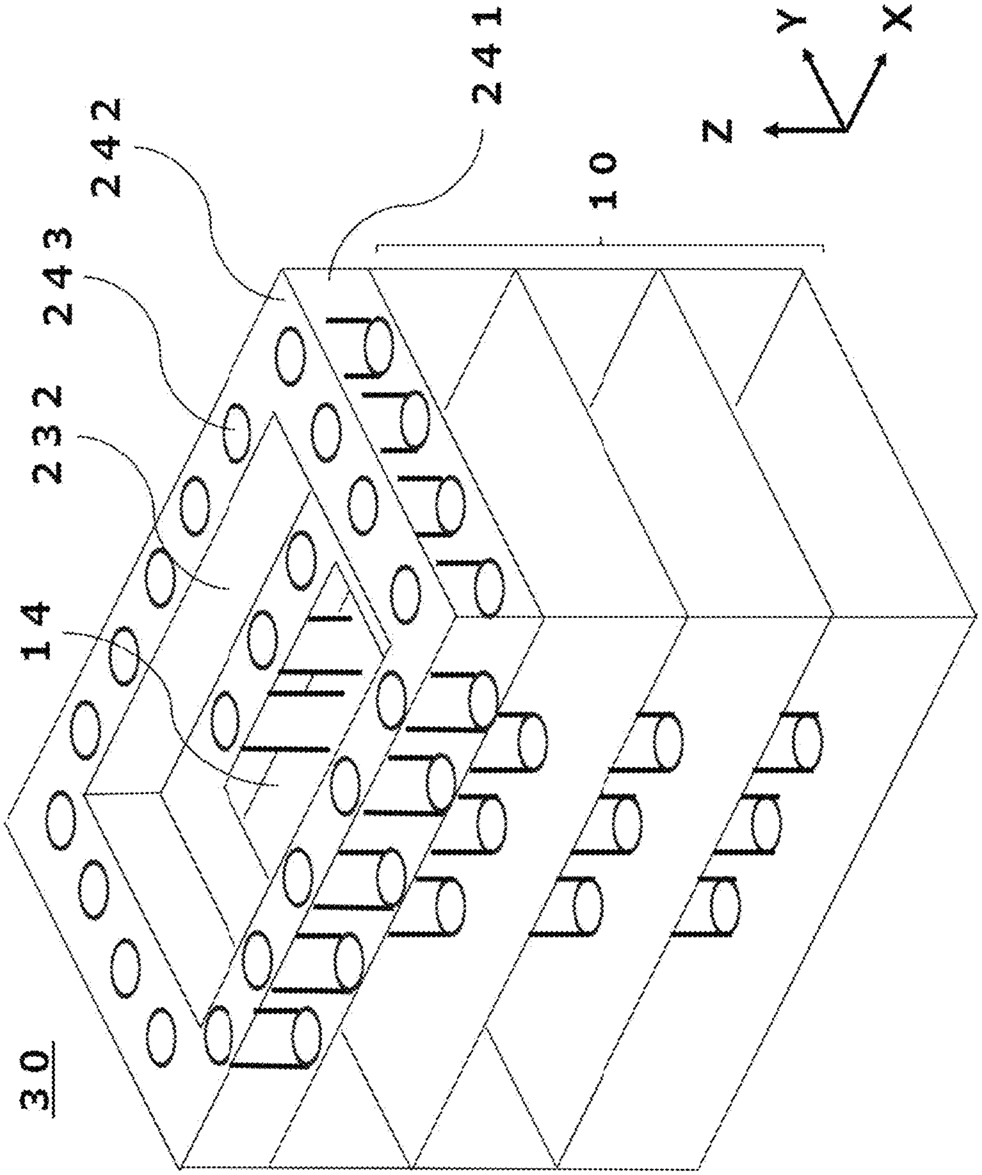
FIG. 24 is a perspective view illustrating a waveguide according to Example 9 of Embodiment 3 of the present disclosure.

FIG. 24 is a perspective view illustrating waveguide 30 according to Example 9 of Embodiment 3 of the present disclosure.

As can be seen from FIGS. 23 and 24, waveguide 30 may be formed by replacing cavity 231 with a laminated substrate formed in the same manner as waveguide 10 according to Example 1 and including dielectric layer 241, copper foil layer 242, and vias 243. Note that FIG. 24 illustrates the example in which vias 243 are disposed in the entire periphery of the opening as in the prior art example (Comparative Example 1), but vias 243 along the short sides illustrated in the figure, for example, vias 243 disposed along a straight line parallel to the electric field do not have to be disposed.

Also in Example 9, the area of opening 232 is larger than the area of opening 14, and opening 232 as seen in the Z-axis direction in FIG. 24 includes opening 14. Thus, it becomes possible to transmit and receive radio waves through opening 232. Therefore, waveguide 30 may also be used as an antenna. Also in this case, the shape of opening 14 and the shape of opening 232 need not be similar to each other. For example, the aspect ratio of opening 14 and the aspect ratio of opening 232 may be different from each other.

Effect of Embodiment

The waveguide (waveguide 10) in the embodiments of the present disclosure includes: a first laminated substrate (laminated substrate 15) in which a first dielectric layer (dielectric layer 11) and a plurality of first conductor layers (copper foil layers 12) including a first opening (opening 14) are laminated on each other; a first through-via group of a plurality of first through-vias (vias 13) electrically connecting between the plurality of first conductor layers, the plurality of first through-vias being linearly arrayed in an in-plane direction of the first laminated substrate at a spacing equal to or less than a half wavelength of an electromagnetic wave propagating through the waveguide; and a second through-via group of a plurality of second through-vias (vias 13) electrically connecting between the plurality of first conductor layers, the plurality of second through-vias being linearly arrayed at the aforementioned spacing in the in-plane direction of the first laminated substrate, in which the waveguide includes no other through-via than the plurality of first through-vias and the plurality of second through-vias, and in the in-plane direction of the first laminated substrate, the first through-via group and the second through-via group are disposed in a direction orthogonal to a direction of an electric field of a signal propagating in a thickness direction of the first laminated substrate, and are disposed to face each other across the first opening. This configuration reduces the total amount of current flowing around the waveguide. It is thus possible to reduce the loss due to conductor loss in a high-frequency band. In addition, the number of vias is reduced as compared with the conventional technique of disposing vias over the entire periphery of the opening. It is thus possible to reduce the manufacturing cost of the substrate.

The waveguide (waveguide 30) in the embodiments of the present disclosure includes: the aforementioned waveguide (waveguide 10); and a second laminated substrate in which a second dielectric layer (dielectric layer 241) and a plurality of second conductor layers (copper foil layers 242) having a second opening are laminated on each other, the second laminated substrate including a plurality of through-vias (vias 243) that are disposed around the second opening and that electrically connect between the plurality of second conductor layers, the second laminated substrate being connected to an upper surface or a lower surface of the above-described waveguide, in which an area of the second opening is larger than an area of the first opening. With this configuration, it is possible to transmit and receive radio waves through the second opening. It is thus possible to use the waveguide as an antenna.

The waveguide (waveguide 30) in the embodiments of the present disclosure includes: the waveguide (waveguide 10); and a conductor (conductor 231) including a third opening (opening 232) and connected to an upper surface or a lower surface of the waveguide, in which an area of the third opening is larger than an area of the first opening. With this configuration, it is possible to transmit and receive radio waves through the third opening. It is thus possible to use the waveguide as an antenna.

The L-shaped waveguide (waveguide 20) in the embodiment of the present disclosure includes: the waveguide (waveguide 10); and a post-wall waveguide (post-wall waveguide 215) including a connection opening (connection opening 221) and connected to an upper surface or a lower surface of the waveguide via the connection opening, in which an area of the connection opening is smaller than an area of the first opening. With this configuration, it is possible to achieve impedance matching, and to convert the transmission direction of the signal by 90 degrees in the substrate.

Although the embodiments have been described above with reference to the drawings, the present disclosure is not limited to these examples. Obviously, a person skilled in the art would arrive variations and modification examples within a scope described in claims. It is understood that these variations and modifications are within the technical scope of the present disclosure. Moreover, any combination of features of the above-mentioned embodiments may be made without departing from the spirit of the disclosure.

The disclosure of Japanese Patent Application No. 2021-152096, filed on Sep. 17, 2021, including the specification, drawings and abstract, is incorporated herein by reference in its entirety.

INDUSTRIAL APPLICABILITY

One exemplary embodiment of the present disclosure is useful for a waveguide that transmits a high-frequency signal.

REFERENCE SIGNS LIST

10 Waveguide
11 Dielectric layer
12 Copper foil layer
13 Via
14 Opening
15 Laminated substrate
51 Electric field
20 Waveguide
211 Dielectric layer
212 Copper foil layer
213 Via
214 Opening
215 Post-wall waveguide
221 Connection opening
30 Waveguide
231 Conductor
232 Opening
241 Dielectric layer
242 Copper foil layer
243 Via

The invention claimed is:

1. A waveguide, comprising:

a first laminated substrate in which a first dielectric layer and a plurality of first conductor layers including a first opening are laminated on each other;

a first through-via group of a plurality of first through-vias electrically connecting between the plurality of first conductor layers, the plurality of first through-vias being linearly arrayed in an in-plane direction of the first laminated substrate at a spacing equal to or less than a half wavelength of an electromagnetic wave propagating through the waveguide; and a second through-via group of a plurality of second through-vias electrically connecting between the plurality of first conductor layers, the plurality of second through-vias being linearly arrayed at the spacing in the in-plane direction of the first laminated substrate, wherein the waveguide includes no other through-via than the plurality of first through-vias and the plurality of second through-vias, in the in-plane direction of the first laminated substrate, the first through-via group and the second through-via group are disposed in a direction orthogonal to a direction of an electric field of a signal propagating in a thickness direction of the first laminated substrate, are disposed to face each other across the first opening, and are disposed along and adjacent respective peripheral edges of the first opening to enclose the first opening, a spacing between the first through-via group and the adjacent peripheral edge of the first opening is less than the spacing of the plurality of first through-vias, and a spacing between the second through-via group and the adjacent peripheral edge of the first opening is less than the spacing of the plurality of second through-vias.

2. The waveguide according to claim 1, wherein at least either the plurality of first through-vias or the plurality of second through-vias are arrayed at an equal spacing in the in-plane direction of the first laminated substrate.

3. The waveguide according to claim 1, wherein at least either the plurality of first through-vias or the plurality of second through-vias are arrayed at an unequal spacing in the in-plane direction of the first laminated substrate.

4. The waveguide according to claim 1, wherein:

the first opening has a shape of a rectangle, and the plurality of first through-vias are arrayed along a straight line extending adjacent one long side of the rectangle, and the plurality of second through-vias are arrayed along a straight line extending adjacent another long side of the rectangle.

5. A waveguide, comprising:

a waveguide according to claim 1; and a second laminated substrate in which a second dielectric layer and a plurality of second conductor layers having a second opening are laminated on each other, the second laminated substrate including a plurality of through-vias that are disposed around the second opening and that electrically connect between the plurality of second conductor layers, the second laminated substrate being connected to an upper surface or a lower surface of the waveguide according to claim 1, wherein an area of the second opening is larger than an area of the first opening.

6. A waveguide, comprising:

a waveguide according to claim 1; and a conductor including a third opening and connected to an upper surface or a lower surface of the waveguide according to claim 1, wherein an area of the third opening is larger than an area of the first opening.

7. An L-shaped waveguide, comprising:

a waveguide according to claim 1; and a post-wall waveguide including a connection opening and connected to an upper surface or a lower surface of the waveguide according to claim 1 via the connection opening, wherein an area of the connection opening is smaller than an area of the first opening.

8. The L-shaped waveguide according to claim 7, wherein a shape of the connection opening and a shape of the first opening are similar to each other.

9. The waveguide according to claim 1, wherein the spacing of the plurality of first through-vias is equal to or less than λ/2, and the spacing of the plurality of second through-vias is equal to or less than λ/2, wherein λ denotes the wavelength of the electromagnetic wave, the spacing between the first through-via group and the adjacent peripheral edge of the first opening is equal to or less than λ/12, and the spacing between the second through-via group and the adjacent peripheral edge of the first opening is equal to or less than λ/12.

* * * * *